(12) United States Patent
Whitley et al.

(10) Patent No.: US 11,244,407 B2
(45) Date of Patent: Feb. 8, 2022

(54) ELECTRONIC RECEIPT-LINKING DATABASE SYSTEM

(71) Applicant: Branch Banking and Trust Company, Winston-Salem, NC (US)

(72) Inventors: Matthew Whitley, Cary, NC (US); Matthew Spriggs, Cary, NC (US); Gopinath Rajagopal, Cary, NC (US); Patricia Kinney, Cary, NC (US); Seneca Meyer, Garner, NC (US); Nixa Espinola, Raleigh, NC (US)

(73) Assignee: TRUIST BANK, Charlotte, NC (US)

( * ) Notice: Subject to any disclaimer, the term of this patent is extended or adjusted under 35 U.S.C. 154(b) by 28 days.

(21) Appl. No.: 16/718,531

(22) Filed: Dec. 18, 2019

(65) Prior Publication Data

US 2020/0126162 A1    Apr. 23, 2020

Related U.S. Application Data

(63) Continuation of application No. 15/148,448, filed on May 6, 2016, now Pat. No. 10,540,724.
(Continued)

(51) Int. Cl.
*G06Q 40/00*    (2012.01)
*H04W 88/02*    (2009.01)
(Continued)

(52) U.S. Cl.
CPC ............. *G06Q 40/12* (2013.12); *G06F 21/64* (2013.01); *G06Q 10/107* (2013.01);
(Continued)

(58) Field of Classification Search
CPC .... G06Q 40/12; G06Q 10/107; G06Q 30/018; G06F 21/64; H04L 51/30; H04L 51/08; H04W 88/02
See application file for complete search history.

(56) References Cited

U.S. PATENT DOCUMENTS

2001/0034769 A1* 10/2001 Rast ........................ H04L 51/26
709/206
2005/0275871 A1* 12/2005 Baird .................. H04N 1/32411
358/1.15
(Continued)

OTHER PUBLICATIONS https://www.nbcnews.com/technolog/take-peek-your-email-metadata-feds-do-6C10569544 ("Subbaraman") (2013) (Year: 2013).*

*Primary Examiner* — A. Hunter Wilder
*Assistant Examiner* — Joseph M Mutschler
(74) *Attorney, Agent, or Firm* — Kilpatrick Townsend & Stockton LLP

(57) ABSTRACT

An electronic receipt system may generate electronic documents including receipt content associated with a transaction between an account holder and a third party, and automatically link the electronic documents to secure records corresponding to account transaction records in a secure database. An account holder may subsequently view an electronic document including the receipt from a secure network platform displaying the secure records for multiple transactions in the account. In some aspects, the electronic receipt system may retrieve the receipt from an email message transmitted to an email address assigned to the account holder by the electronic receipt system. In other aspects, the electronic receipt may be retrieved using an application on a user device corresponding to the electronic receipt system.

20 Claims, 16 Drawing Sheets

Related U.S. Application Data

(60) Provisional application No. 62/157,841, filed on May 6, 2015.

(51) Int. Cl.
*G06Q 30/00* (2012.01)
*G06Q 10/10* (2012.01)
*G06F 21/64* (2013.01)
*H04L 12/58* (2006.01)

(52) U.S. Cl.
CPC ........... *G06Q 30/018* (2013.01); *H04L 51/30* (2013.01); *H04W 88/02* (2013.01); *H04L 51/08* (2013.01)

(56) References Cited

U.S. PATENT DOCUMENTS

| | | | | |
|---|---|---|---|---|
| 2012/0078682 A1* | 3/2012 | Pinsley | ................. | G06Q 40/12 705/7.29 |
| 2012/0290609 A1* | 11/2012 | Britt | ..................... | G06Q 20/327 707/769 |
| 2014/0074675 A1* | 3/2014 | Calman | ................ | G06Q 20/047 705/35 |
| 2014/0372262 A1* | 12/2014 | Young | .................... | G06Q 40/12 705/30 |
| 2016/0012550 A1* | 1/2016 | Carbo | ................. | G06Q 10/107 705/30 |
| 2016/0328803 A1 | 11/2016 | Whitley et al. | | |

* cited by examiner

ELECTRONIC RECEIPT-LINKING DATABASE SYSTEM

CROSS-REFERENCE TO RELATED APPLICATION

This is a continuation of co-pending U.S. patent application Ser. No. 15/148,448, titled "Electronic Receipt-Linking Database System" and filed on May 6, 2016, which claims priority to U.S. Provisional Application Ser. No. 62/157,841, filed May 6, 2015 and titled "Electronic Receipt Capture," the contents of each of which are incorporated herein by reference.

TECHNICAL FIELD

The present disclosure generally relates to databases systems, and, more particularly, although not necessarily exclusively, to linking electronic receipt content from electronic mail messages to secure database records viewable on a network platform.

BACKGROUND

Online retailers may use electronic receipts or invoices for electronic purchases made by consumers on the Internet. An electronic receipt may be transmitted to a consumer's electronic mail ("email") inbox via an email address provided by the consumer. Retailers at brick-and-mortar stores may also offer consumers the option to receive an electronic receipt for their purchases via email in addition to, or in lieu of, a paper receipt. Consumers wishing to receive an electronic receipt may provide an email address corresponding to an inbox to which the electronic receipt is transmitted from the brick-and-mortar store.

SUMMARY

In some aspects, a system may include a processing device communicatively couplable to an electronic mail (email) server having a common inbox for storing a plurality of email messages received in the common inbox based on a domain part of corresponding email addresses for the plurality of email messages. They system may also include a memory device accessible to the processing device and including instructions executable by the processing device to cause the processing device to retrieve the plurality of email messages from the common inbox. The memory device may also include instructions to cause the processing device to determine an account holder associated with an email message of the plurality of email messages using a local part of an email address corresponding to the email message. The memory device may also include instructions to cause the processing device to identify receipt content within the email message. The receipt content may correspond to a receipt for a transaction between the account holder and a third party using an account associated with the account holder. The memory device may also include instructions to cause the processing device to extract metadata from the email message. The metadata may include information corresponding to the receipt content for the transaction. The memory device may also include instructions to cause the processing device to generate an electronic document including the receipt content and having a format displayable to the account holder on a user device communicatively coupled to the processing device via a network.

In certain aspects, the memory device may also include instructions to cause the processing device to identify, using the metadata, a secure record of the transaction stored in a database having account information associated with the account. The account information may include a plurality of secure records corresponding to a plurality of transactions and stored authentication information. The memory device may also include instructions to cause the processing device to associate the receipt content, the metadata, and the electronic document with the secure record. The memory device may also include instructions to cause the processing device to authenticate the account holder to allow the account holder to view, on the user device, the secure record and the electronic document by comparing the stored authentication information with authentication information received from the account holder via the user device.

In another aspect, a method may include retrieving, by a processing device, an email message from a common inbox of an email server. The email message may include an email address having a local part corresponding to a username of an account holder and a domain part useable to direct the email message to the common inbox. The method may also include determining, by the processing device, an identity of the account holder associated with the email message using the local part. The method may also include extracting, by the processing device, receipt content within the email message. The receipt content may correspond to a receipt for a transaction between the account holder and a third party using an account associated with the account holder. The method may also include extracting, by the processing device, metadata from the email message. The metadata may include information corresponding to the receipt content for the transaction. The method may also include generating an electronic document including the receipt content and having a format displayable to the account holder on a user device communicatively coupled to the processing device via a network.

In certain aspects, the method may also include identifying, using the metadata, a secure record of the transaction stored in a database having account information associated with the account. The account information including stored authentication information and the secure record. The method may also include associating the receipt content, the metadata, and the electronic document with the secure record. The method may also include authenticating the account holder to allow the account holder to view, on the user device, the secure record, the electronic document, and the metadata by comparing the stored authentication information with authentication information received from the account holder via the user device.

In another aspect, a system may include a user device that is operable by an account holder to view secure account information for an account associated with the account holder. The secure account information may be stored in a remote database of an electronic receipt system accessible to the user device via a network. The remote database may include a secure record corresponding to a transaction between the account holder and a third party using the account. The user device may include a processing device and a memory device including instructions executable by the processing device to cause the processing device to receive authentication information from the account holder via a keyboard tool of the user device. The authentication information may match stored authentication information located in the remote database to authenticate the account holder to view the secure record on a display of the user device. The memory device may also include instructions executable by the processing device to cause the processing device to receive from the electronic receipt system, via the network, one or more user interfaces displayable on the display of the user device.

In certain aspects, the user interfaces may include a first user interface for displaying transaction details included in the secure record and corresponding to the transaction. The first user interface may include a first selection option selectable by the account holder using a selection tool of the user device and corresponding to a first request to view an electronic document corresponding to a receipt for the transaction. The user interfaces may also include a second user interface for displaying the electronic document and a second selection option selectable by the account holder via the selection tool and corresponding to a second request to view or modify metadata associated with the receipt. The metadata may include (1) sender information corresponding to a sender of the receipt to an electronic mail (email) server via an email message and (2) timestamp information corresponding to a date that the email message was received by the email server or stored in a common inbox of the email server.

DETAILED DESCRIPTION

Figure 1:
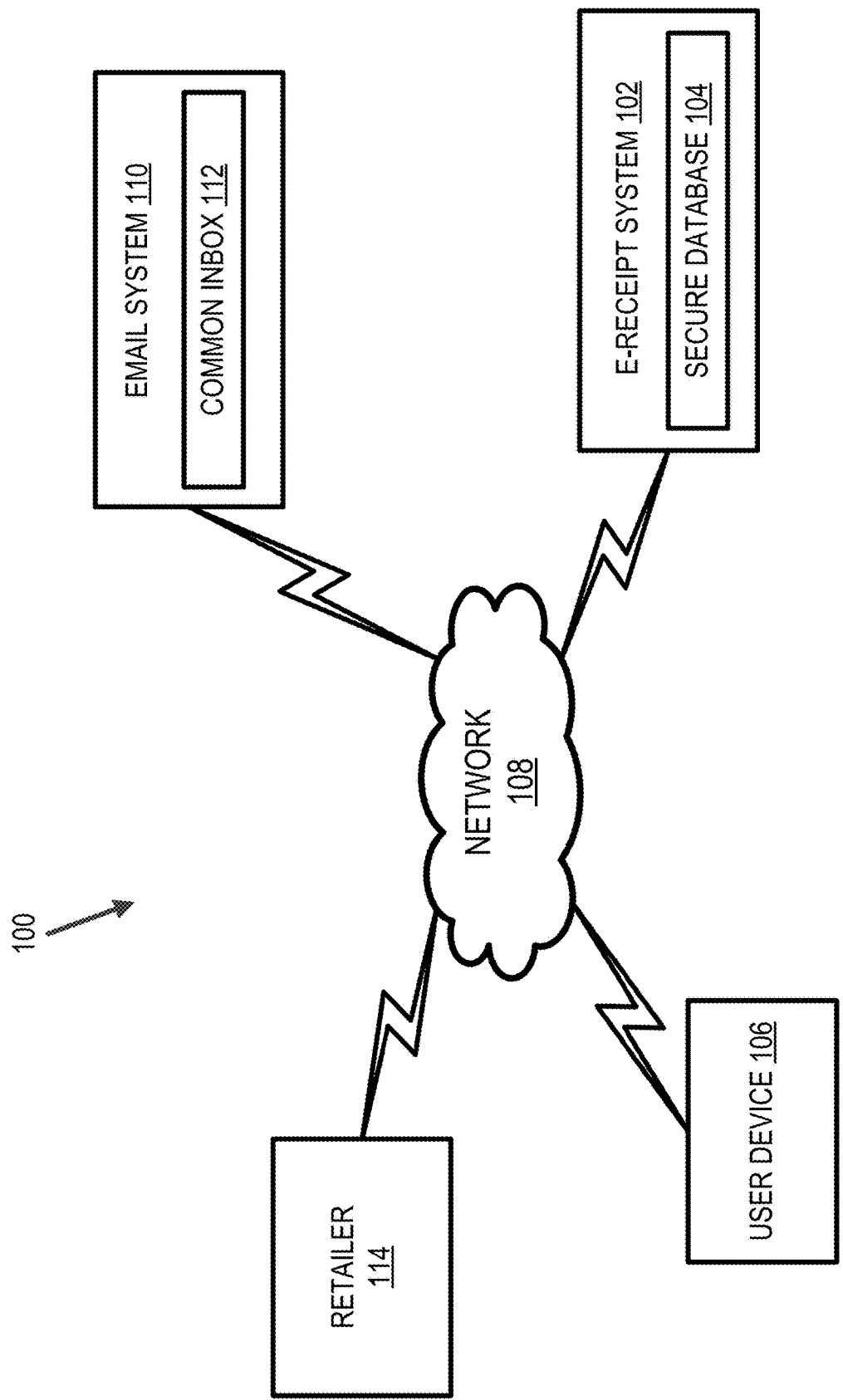
FIG. 1 is a block diagram depicting a network environment including an electronic receipt system according to some aspects of the present disclosure.

Certain aspects and examples of the present disclosure relate to generating electronic documents from receipt content of an electronic mail ("email") message and linking the electronic documents to secure records in a secure database corresponding to a transaction. The electronic documents may be viewable by an account holder from a secure network platform displaying the secure records for transactions between the account holder and third parties using an account. In some aspects, the electronic documents including the receipt content may be automatically linked to a secure record in the secure database using the metadata or description transmitted with the electronic receipt. For example, an email message including electronic receipt content may include "From" metadata having the email address from which the electronic receipt was sent and "Timestamp" metadata indicating when the email having the electronic receipt was sent by the retailer. The "From" metadata may be used to determine a retailer for a transaction associated with the electronic receipt. The electronic receipt system according to some aspects may link the electronic document (including the receipt content) to a secure record stored in the database by matching the metadata with a secure record corresponding to a transaction involving the same retailer indicated by the "From" metadata and occurring at or about the same time as the time indicated by the "Timestamp" metadata. When the account holder is authenticated to view the transaction record, details from the transaction record may be displayed, including a hyperlink or other access point for accessing the electronic document linked to the transaction record.

In some aspects, the account holder may be assigned a unique email address for receiving electronic receipts for purchases made by the account holder from third parties, including various retailers. The email address may include a local part corresponding to the account holder and a domain part corresponding to an entity managing the account and electronic receipt system. An electronic mail ("email") message having an electronic receipt for the purchase may be transmitted to and stored in a common inbox associated with the account-managing entity. A system according to some aspects may capture the email message from the common inbox, extract metadata and receipt content from the email message, and convert the receipt content to an electronic document, such as a portable document format ("PDF") document. The system may use the metadata from the email message to identify and link the electronic document with a secure record stored in a secure database corresponding to a transaction associated with the electronic receipt.

In some aspects, a user device may include a client-side engine in memory that may launch a device application for receiving images of receipts. The client-side engine may cause the user device to launch a recording device, such as a camera, of the user device to capture an image of a receipt corresponding to a transaction and to transmit the image with a description of the receipt to the system. The system may receive the image, extract the description as metadata, and convert the image into an electronic document that may be linked to a secure record of the transaction in the database. In some aspects, the system may further authenticate the account holder to access a network platform in which the account holder may view the secure record of the transaction and the electronic document linked to the secure record. Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Various aspects of the present disclosure may be implemented in various environments. For example, FIG. 1 is a block diagram depicting a network environment 100 including an electronic receipt system 102 according to some aspects of the present disclosure. The electronic receipt system 102 includes one or more server devices for linking electronic receipts to secure records corresponding to transactions associated an account held by an account holder. The electronic receipt may include receipt content that describes the details of a transaction between the account holder and a third party performed using money from the account. In some aspects, the electronic receipt system 102 may generate electronic documents including the receipt content. The electronic receipt system 102 may identify the transaction record corresponding to the transaction described in the receipt content and may link the electronic document to the transaction record. The electronic receipt system 102 may include a secure database 104 in which the transaction records are stored.

The secure database 104 may be a secure location in the electronic receipt system 102. The transaction records stored in the secure database 104 may be accessible to the account holder only subsequent to the account holder being authenticated by the electronic receipt system 102. In some aspects, subsequent to authenticating the account holder, the electronic receipt system 102 may generate one or a series of user interfaces displayable to the account holder and including the transaction records and the corresponding electronic documents including the receipt content associated with the transaction. In some aspects, the account holder may access the electronic receipt system 102 from a user device 106 to view the transaction records. The user device 106 may be a computing device, such as a personal computer, smartphone, personal digital assistant ("PDA"), tablet, or other device. The user device 106 may be communicatively coupled to the electronic receipt system 102 via a network 108, such as the Internet.

In some aspects, the electronic receipt system 102 may receive an electronic receipt associated with a transaction from an email system 110. The email system 110 may be accessible to the network 108 and may receive email messages including electronic receipts. The electronic receipt system 102 may generate an email address for the account holder that may be used by the account holder or third parties to transmit email messages including electronic receipts to the email system 110. The email address generated by the electronic receipt system 102 may include a local part and a domain part. For example, the electronic receipt system 102 may generate the email address "john.doe@bank.com," where "john.doe" is the local part of email address and "bank.com" is the domain part of the email address. In some aspects, the local part of the email address may correspond to a username selected by the account holder and associating the email address with the account holder in the secure database 104. The email system 110 may include a common inbox 112 for storing email messages received by the email system 110. Email messages transmitted to an email address having the same domain part (e.g., "bank.com") may be routed by the email system 110 to the common inbox 112.

In some aspects, the email message including the electronic receipt may be transmitted to the email system by a retailer 114. The retailer 114 may be a third party, such as a merchant, service provider, entity, or individual involved in the transaction with the account holder. For example, the account holder may purchase goods or services from the retailer 114 and the retailer 114 may generate an electronic receipt documenting the payment transaction for the goods or services. The account holder may provide the retailer 114 with the email address generated by the electronic receipt system 102 and may transmit an electronic copy of the receipt to the email address provided by the account holder.

The electronic receipt system 102 may retrieve the email message from the common inbox 112 and may associate them with the account holder using the local part of the email address (e.g., "john.doe"). The electronic receipt system 102 may be communicatively coupled to the email system 110 via the network 108. Although the email system 110 is shown in FIG. 1 as a separate system from the electronic receipt system 102, the email system 110 may alternatively be a subsystem of the electronic receipt system 102 without departing from the scope of the present disclosure. Similarly, the electronic receipt system 102 and the email system 110 may be communicatively coupled through a network separate from the network 108 or through a bus. The electronic receipt system 102 may associate the email including the electronic receipt with the account holder based on the local part of the email address, which may correspond to a username of the account holder.

In additional and alternative aspects, the electronic receipt system 102 may receive an electronic receipt directly from the account holder via the user device 106. In some aspects, the user device 106 may launch a client-side application that may allow the account holder to upload a receipt image captured by a camera of the user device 106 or retrieved from a storage device of the user device. For example, the client-side application may allow the account holder to take a picture of a paper receipt corresponding to a transaction between the account holder and the retailer 114. The account holder may transmit the receipt image to the electronic receipt system 102 from the user device 106 via the network 108. The client-side application may also allow the account holder to input a description of the receipt that may be transmitted to the electronic receipt system 102 with the receipt image.

Figure 2:
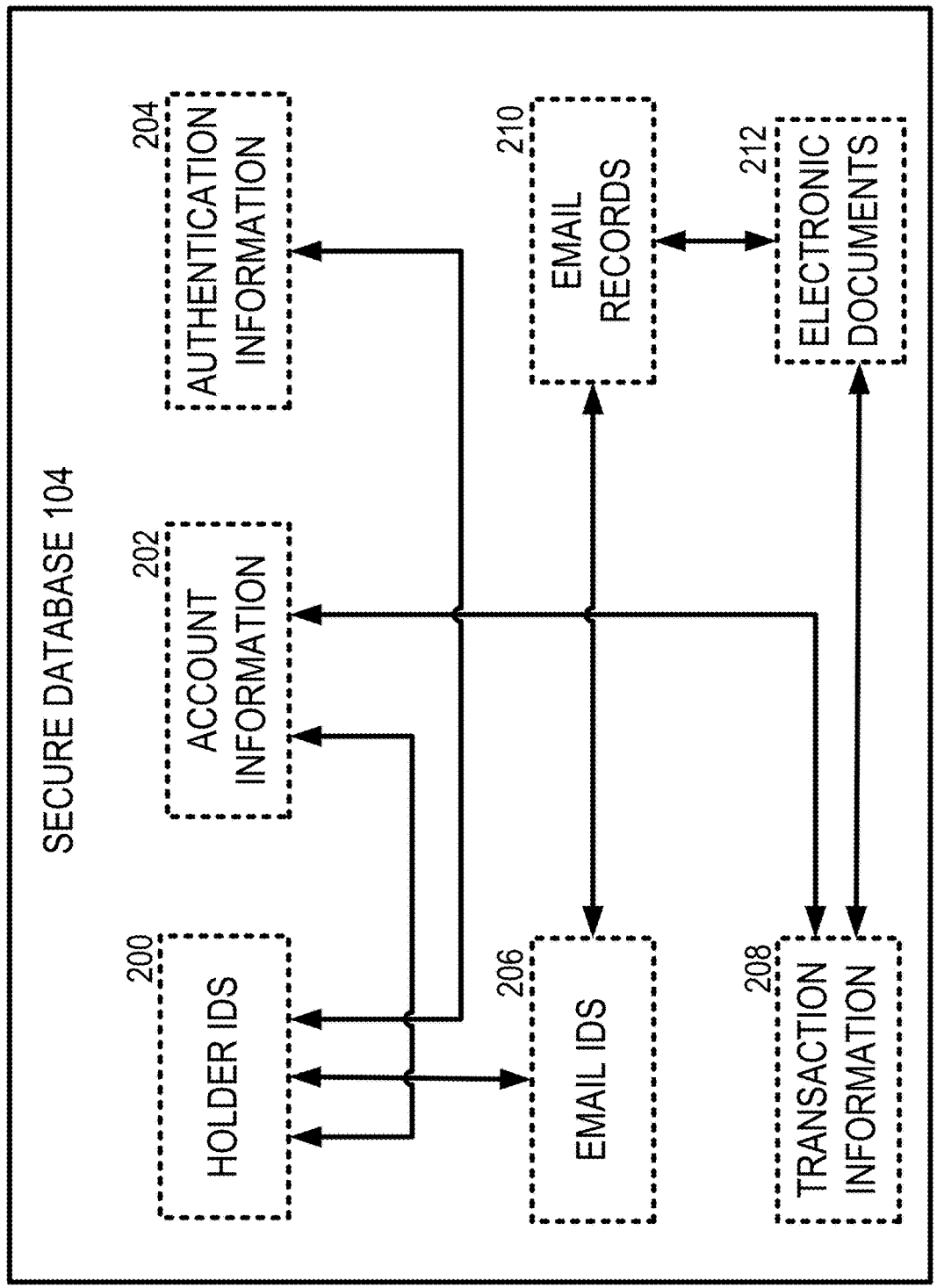
FIG. 2 is a block diagram depicting memory locations in the electronic receipt system database of FIG. 1 according to aspects of the present disclosure.

FIG. 2 is a block diagram depicting memory locations in the electronic receipt system's 100 secure database 104 according to aspects of the present disclosure. The secure database 104 may associate information within each location to link electronic documents including electronic receipt content to an appropriate account holder. The secure database 104 may also use the associations to allow an account holder, subsequent to authentication by the electronic receipt system 102, to view electronic documents having information corresponding to a secure record stored in the secure database 104 from a user device via the network 108 of FIG. 1. In some aspects, the information may be associated in one or more indices in the secure database 104. For example, an index may include one or more columns, each including information that is associated with additional information in the same column of the index. In additional and alternative aspects, the information may be associated using pointers, objects, or other means for associating related information in the secure database 104. The information stored in the secure database 104 may be separated or partitioned by information type to allow the electronic receipt system 102 to query information based on the type. In some aspects, the association between the information stored in the secure database 104 may allow the electronic receipt system 102 to query information based on one type and use the associations to determine information of another type that is associated with the queried information.

Holder identifiers 200 are stored in the secure database 104 and include information corresponding to an identity of the account holders of the electronic receipt system 102. In some aspects, the holder identifiers 200 may include a unique set of alphanumeric characters, such as an online banking ("OLB") number assigned to each account holder by the electronic receipt system 102 to distinguish each account holder from the others. In other aspects, the holder identifier 200 may include a unique set of alphanumeric characters provided by or issued to each account holder, such as, but not limited to a social security number or driver's license number. The holder identifier 200 for each account holder may be used to associate account information 202, authentication information 204, and email identifiers 206 with the account holder as represented by the arrows in FIG. 2.

The account information 202 may include information corresponding to one or more accounts held by each account holder. Examples of information that may be included as account information 202 may include an account number or a routing number associated with the account. The account information 202 may be associated with a holder identifier 200 corresponding to the account holder. The authentication information 204 may include information that may be used to authenticate the account holder to view secure records stored in the secure database 104. In some aspects, the authentication information 204 may include information provided by the account holder, such as, but not limited to, a username, password, social security number, passcode, or other authenticating information. In other aspects, the authentication information 204 may include information provided to the account holder, such as a personal identification number ("PIN"). The authentication information 204 may be stored in the secure database 104 and compared with input from the account holder via a user device (e.g., user device 106 of FIG. 1) for a match to conclude that the account holder is authorized to view the account information. In some aspects, the account information 202 may be accessed using the authentication information 204. For example, subsequent to the electronic receipt system 102 authenticating the account holder, the association between the authentication information 204 and the holder identifier 200 and the association between the holder identifier 200 and the account information 202 may be used to identify account information 202 corresponding to the authenticated account holder. The email identifiers 206 may include information corresponding to an email address generated by the electronic receipt system 102 that may be used to transmit electronic receipts to the system 102. In some examples, the email identifiers 206 may include a username that may be used as the local part of an email address assigned to the user. The email address may be used by third parties to transmit electronic receipts to the electronic receipt system 102.

The secure database 104 also includes transaction information 208. The transaction information 208 may include secure records corresponding to transactions between account holders and third parties for accounts corresponding to the account information 202. The transaction information 208 is associated with the account information 202 to allow the electronic receipt system 102 to determine to which account each secure record belongs. An email records list 210 may include email records corresponding to the email messages including electronic receipts that are received by the electronic receipt system 102 from the common inbox 112 of FIG. 1. The email records in the email records list 210 are associated with the account information 202, the email identifiers 206, and the transaction information 208. The email records in the email records list 210 may be associated with the account information 202 to allow email records not automatically matched to a secure record of the transaction information 208 to be accessible to the account holder for manually matching. The email records in the email records list 210 may be associated with the transaction information 208 to allow the account holder to view email records in the email records list 210 previously matched to a secure record of the transaction information 208. The email records in the email records list 210 may be associated with the email identifiers 206 to allow the electronic receipt system 102 to determine the email record associated with a particular account holder subsequent to retrieving the email messages from the common inbox 112 of FIG. 1. For example, the electronic receipt system 102 may retrieve an email message from the common inbox 112 and use the username stored as an email identifier 206 in the secure database 104 to generate an email record and associate the email record with the account holder using the username.

The electronic documents 212 may include electronic documents generated by the electronic receipt system 102 and including receipt content extracted from the email messages retrieved by the electronic receipt system 102 from the common inbox 112 of FIG. 1. The electronic documents 212 may be associated with the transaction information 208 to allow an electronic receipt having receipt content corresponding to a transaction to be viewed by the account holder from a user interface including information from the secure record of the transaction information 208 corresponding to the transaction. The electronic documents 212 may also be associated with the email record to allow the electronic documents 212 to be viewed by the account holder from a user interface displaying email records in an account holder's email records list 210. Although specific direct and indirect associations are shown, the electronic receipt system may have additional or alternative associations without departing from the scope of the present disclosure.

Figure 3:
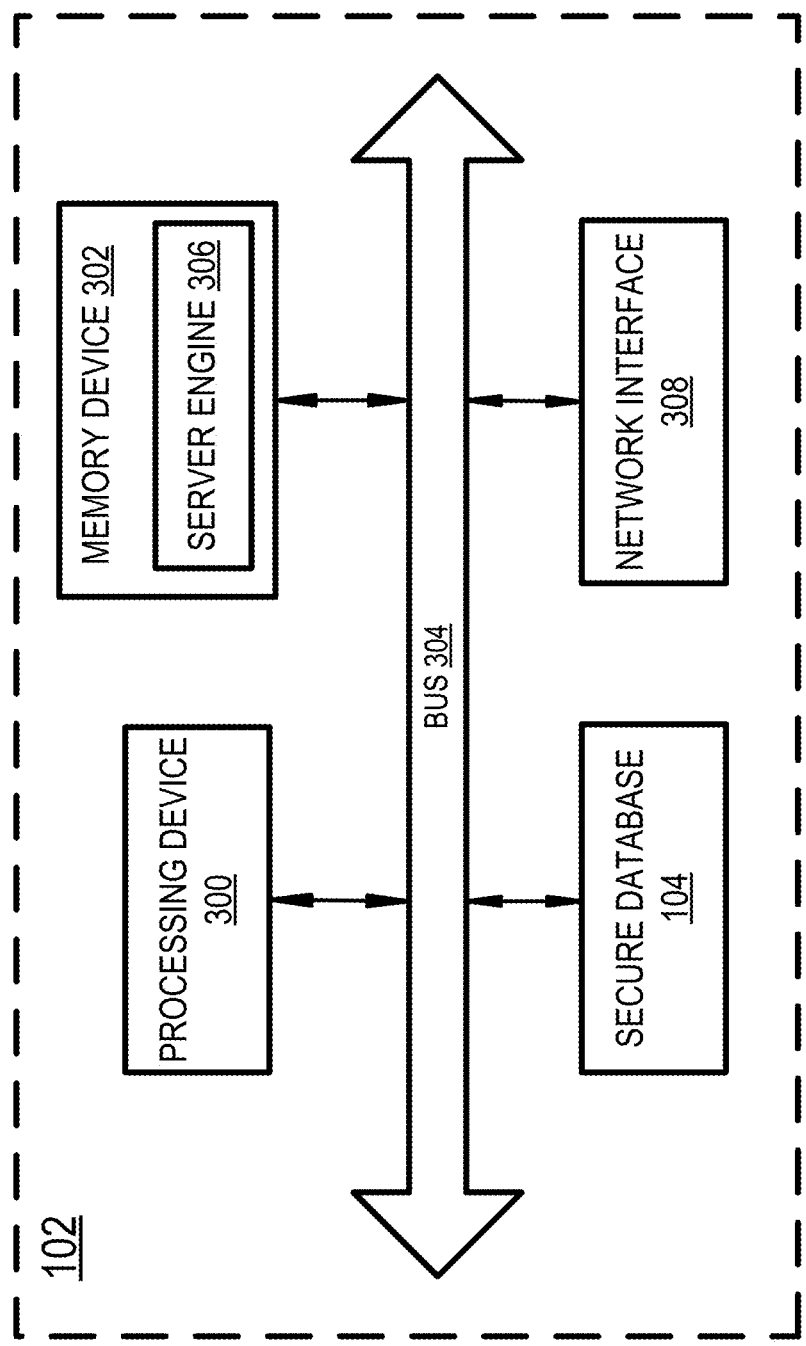
FIG. 3 is a block diagram depicting the electronic receipt system of FIG. 1 according to some aspects of the present disclosure.

FIG. 3 is a block diagram depicting the electronic receipt system 102 according to some aspects of the present disclosure. The electronic receipt system 102 includes a processing device 300, a memory device 302, and a bus 304 connecting the processing device 300 and the memory device 302. The processing device 300 may execute one or more operations for receiving electronic receipts, generating documents corresponding to the electronic receipts, and linking the documents to transaction records. The processing device 300 may execute instructions stored in the memory device 302 to perform the operations. The processing device 300 may include one processing device or multiple processing devices. Non-limiting examples of the processing device 300 may include a field-programmable gate array, an application-specific integrated circuit ("ASIC"), and a microprocessor. The memory device 302 may include any type of storage device that retains stored information when powered off. Non-limiting examples of the memory device 302 include electrically erasable and programmable read-only memory, a flash memory, or any other type of non-volatile memory.

In some examples, at least a portion of the memory device 302 may include a computer-readable medium from which the processing device 300 can read instructions of the memory device 302. A computer-readable medium may include electronic, optical, magnetic, or other storage devices capable of providing the processing device 300 with computer-readable instructions or other program code. Non-limiting examples of a computer-readable medium include magnetic disks, memory chips, read-only memory, random-access memory, an ASIC, a configured processor, optical storage, or any other medium from which the processing device 300 may read instructions. The instructions may include processor-specific instructions generated by a compiler or an interpreter from code written in any suitable computer-programming language, including, for example, C, C++, C #, COBOL, Java, etc. The instructions may include an application, such as a server engine 306, that, when executed by the processing device 300, may cause the processing device 300 to generate a user interface or a series of user interfaces for receiving authentication information from the account holder, permitting the account holder to view transaction records associated with an account, and to view and modify receipt information corresponding to electronic receipts received by the electronic receipt system 102. In some aspects, the secure database 104 may store information received from an account holder via the user interfaces generated by the server engine 306.

The electronic receipt system 102 also includes a network interface 308. The network interface 308 may be coupled to the processing device 300 and the memory device 302 via the bus 304. The network interface 308 may include a network card or other device communicatively coupled to the network 108 of FIG. 1 to allow user devices (e.g., user device 106 of FIG. 1) to access the electronic receipt system 102. The network interface 308 may transmit the user interfaces generated by the server engine 306 to the user devices via the network 108 of FIG. 1 and may receive information from the user devices.

Figure 4:
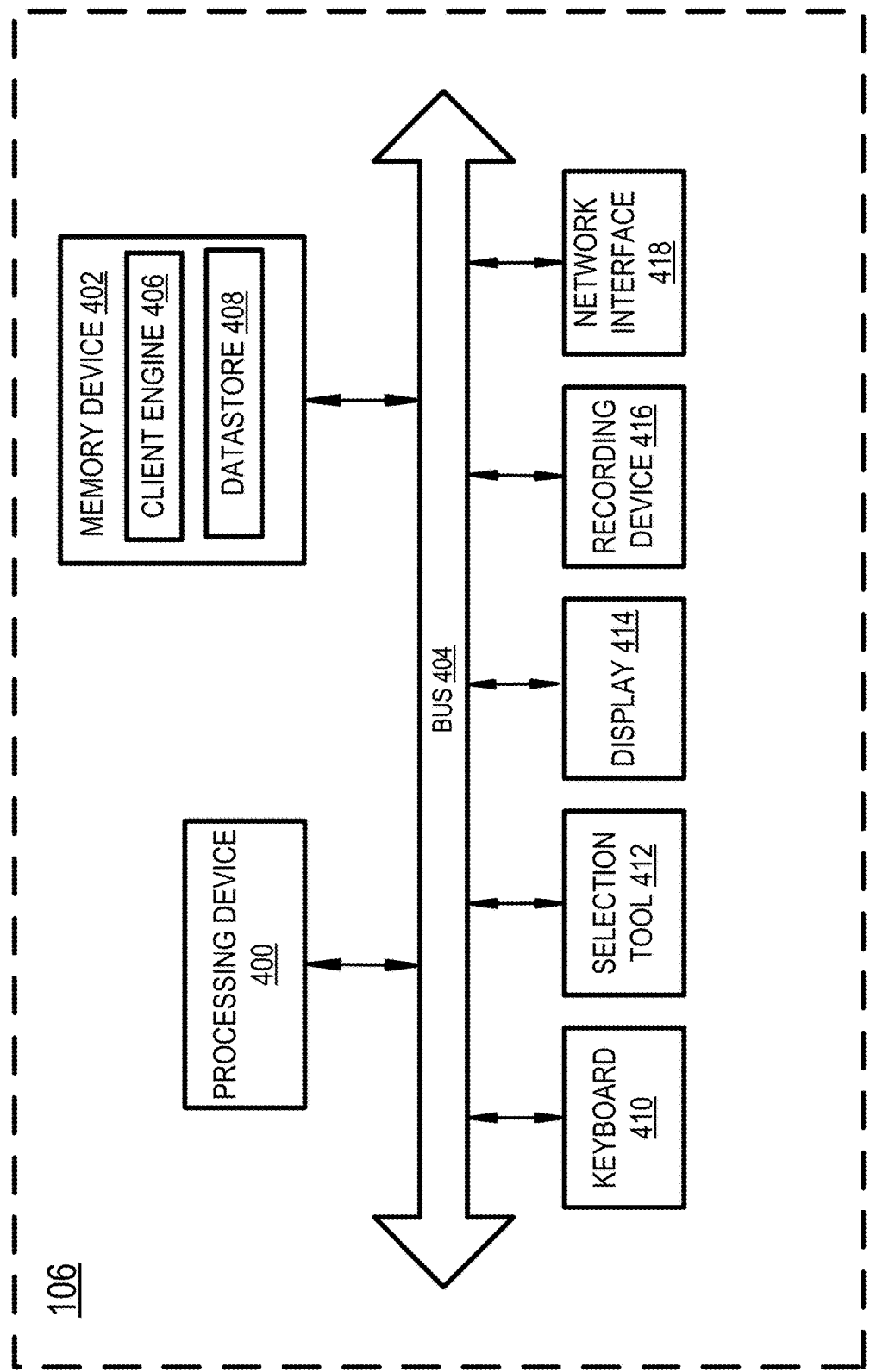
FIG. 4 is a block diagram depicting the user device of FIG. 1 according to some aspects of the present disclosure.

FIG. 4 is a block diagram depicting an example the user device 106 according to some aspects of the present disclosure. The user device 106 includes a processing device 400 and a memory device 402 coupled to a bus 404. The processing device 400 may include one or more processors, including without limitation one or more general-purpose processors or one or more special-purpose processors (such as digital signal processing chips, graphic acceleration processors, etc.). The processing device 400 may execute one or more operations for generating user interfaces and for transmitting information to the electronic receipt system 102 of FIG. 1. The processing device 400 may execute instructions stored in the memory device 402 to perform the operations. Non-limiting examples of the processing device 400 may include a field-programmable gate array ("FPGA"), an application-specific integrated circuit ("ASIC"), a microprocessor, etc. The memory device 402 may include any type of storage device that retains stored information when powered off. Non-limiting examples of the memory device 402 may include electrically erasable and programmable read-only memory ("EEPROM"), a flash memory, or any other type of non-volatile memory. In some examples, at least a portion of the memory device 402 may include a non-transitory computer-readable medium from which the processing device 400 can read the instructions.

A computer-readable medium may include electronic, optical, magnetic, or other storage devices capable of providing the processing device 300 with computer-readable instructions or other program code. Non-limiting examples of computer-readable medium include, but are not limited to, magnetic disks, memory chips, ROM, random-access memory ("RAM"), an ASIC, a configured processor, optical storage, or any other medium from which a computer processor can read the instructions. The instructions may include processor-specific instructions generated by a compiler or an interpreter from code written in any suitable computer-programming language, including, for example, C, C++, C #, Java, etc. The instructions may include an application, such as client engine 406, that, when executed by the processing device 400, may cause the processing device 400 to generate a user interface or a series of user interfaces for allowing an account holder to transmit information between the user device 106 and the electronic receipt system 102 of FIG. 1. In some aspects, the memory device 402 may also include storage space (e.g., datastore 408) in which content and data may be stored. For example, the datastore 408 may store shells or templates of the user interfaces that may be used to generate user interfaces. In other aspects, the datastore 408 may include one or more images captured by a recording device of the user device 106.

The user device 106 also includes a keyboard 410, a selection tool 412, and a display unit 414. The keyboard 410, the selection tool 412, and the display unit 414 may be coupled to the processing device 400 and the memory device 402 via the bus 404. The keyboard 410 may be physical keyboard or may be a virtual keyboard displayed on the display unit 414 and selectable by the account holder via the selection tool 412 to input alphanumeric and other characters (e.g., a touchscreen keyboard). The selection tool 412 may include a mouse, a touchpad, a touch screen, or other suitable means to allow an account holder to select items or other available selections presented to the account holder on the display unit 414. The display unit 414 may display user interfaces generated by the electronic receipt system 102 or the processing device 400 of the user device 106 in response to instructions of the client engine 406. In some aspects, the display unit 414 may include any CRT, LCD, OLED, or other device for displaying the user interfaces. The user device 106 also includes a recording device 416. The recording device 416 may include hardware in or attached to the user device 106 that may allow the account holder to visually capture a receipt corresponding to a transaction. In some aspects, the recording device 416 may include a digital camera capable of generating an image of the receipt. In additional aspects, the images captured by the recording device 416 may be stored in the datastore 408.

The user device 106 also includes a network interface 418 that may allow the user device 106 to access the network 108 of FIG. 1 for communicating with the electronic receipt system 102. The network interface 418 may be coupled to the processing device 400 and the memory device 402 via the bus 404. The network interface 418 may include a network card or other device positioned in the user device 106.

Figure 5:
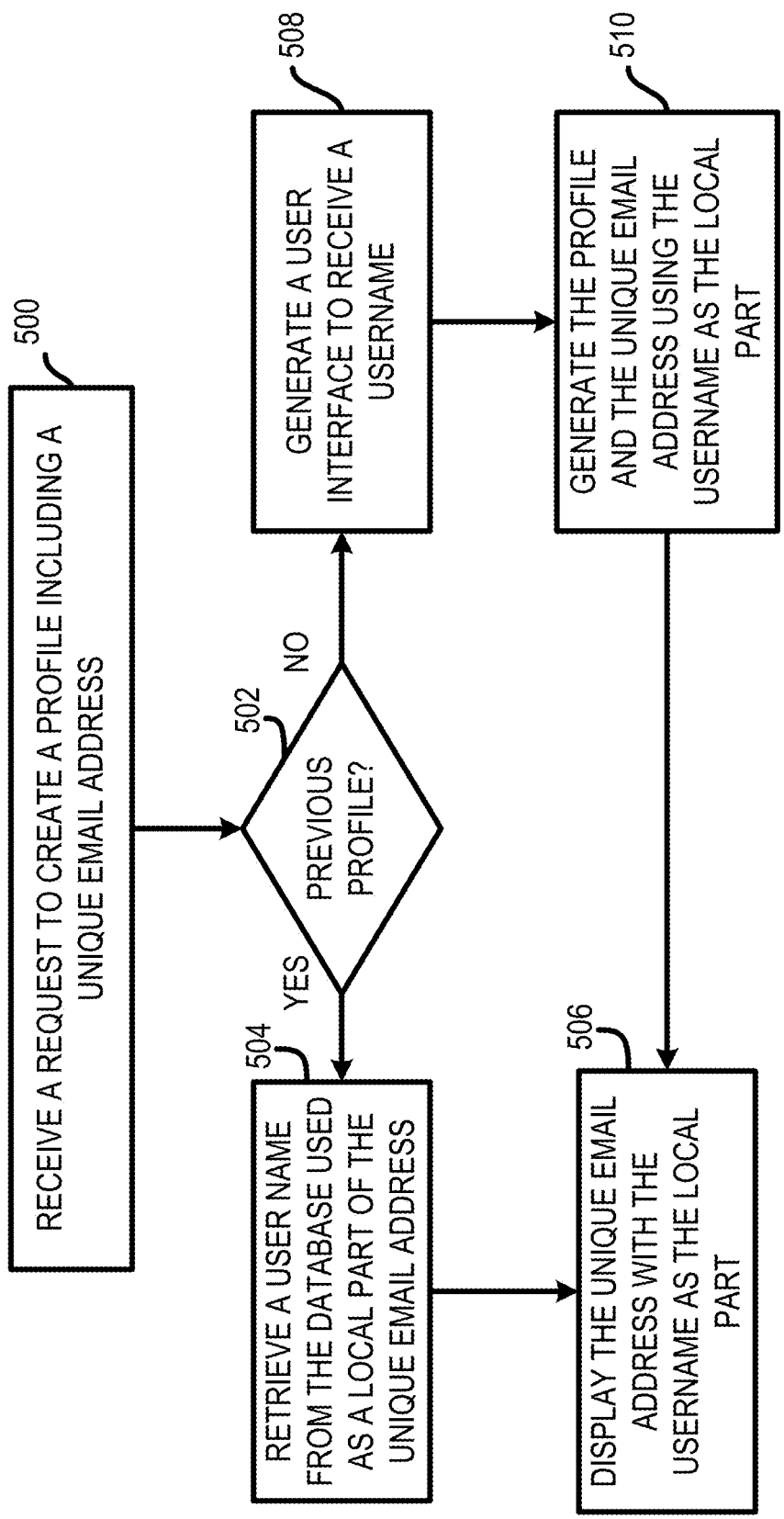
FIG. 5 is a flow chart of a process for assigning an email address for transmitting an electronic receipt according to some aspects of the present disclosure.

FIG. 5 is a flow chart of a process for assigning a unique email address for transmitting an electronic receipt according to some aspects of the present disclosure. The process is described with respect to the network environment 100 of FIG. 1, the associations of the secure database 104 described in FIG. 2, and the electronic receipt system 102 of FIG. 3, though other implementations are possible without departing from the scope of the present disclosure.

In block 500, the electronic receipt system 102 receives a request to create a profile including a unique email address. In some aspects, the request may be received from an account holder via the user device 106. The profile may include information corresponding to the account holder and at least one account held by the account holder. In some aspects, the profile may include an OLB number associated with the account holder's online banking activity and stored as a holder identifier 200 for the account holder. In additional and alternative aspects, the profile may include the account information 202, such as an account number or routing number. The electronic receipt system 102 may retrieve this information from the secure database 104 or another database communicatively coupled to the electronic receipt system 102 subsequent to authenticating the account holder to access the electronic receipt system 102. For example, the account holder may be prompted to enter authentication information 204, such as a user identifier or password corresponding to authentication information stored in the secure database 104, to verify that a user of the user device is the account holder. The profile may also include an email identifier 206, such as a username selected by the account holder. The username may be used as the local part of an email address that the account holder may use to transmit electronic receipts to the common inbox 112 for retrieval by the electronic receipt system 102. The username may be stored in the secure database 104 as an email identifier 206 and associated with the account holder and accounts held by the account holder as described in FIG. 2.

In block 502, the electronic receipt system 102 determines whether the account holder already has a profile established and stored in the secure database 104. In some aspects, the electronic receipt system 102 may use authentication information to identify the account holder and locate information associated with the account holder in the secure database 104. In block 504, subsequent to determining that a profile is associated with the account holder in the secure database 104, the electronic receipt system may retrieve the username included in the profile from the transaction. In block 506, the electronic receipt system 102 displays the unique email address using the username retrieved from the profile in the secure database 104 as the local part of the email address.

In block 508, subsequent to a determining that there is no profile information associated with the account holder in the secure database 104, the electronic receipt system 102 generates a user interface to receive a username from the account holder. In some aspects, the user interface may be generated and displayed on a display unit 414 of the user device 106. The user interface may include an input option to allow the account holder to enter a username that may be used as a local part of the email address and stored as an email identifier 206 in the secure database 104. In some aspects, the username may be required to be different from usernames selected by other account holders to ensure that the email address is unique to the account holder.

Figure 6:
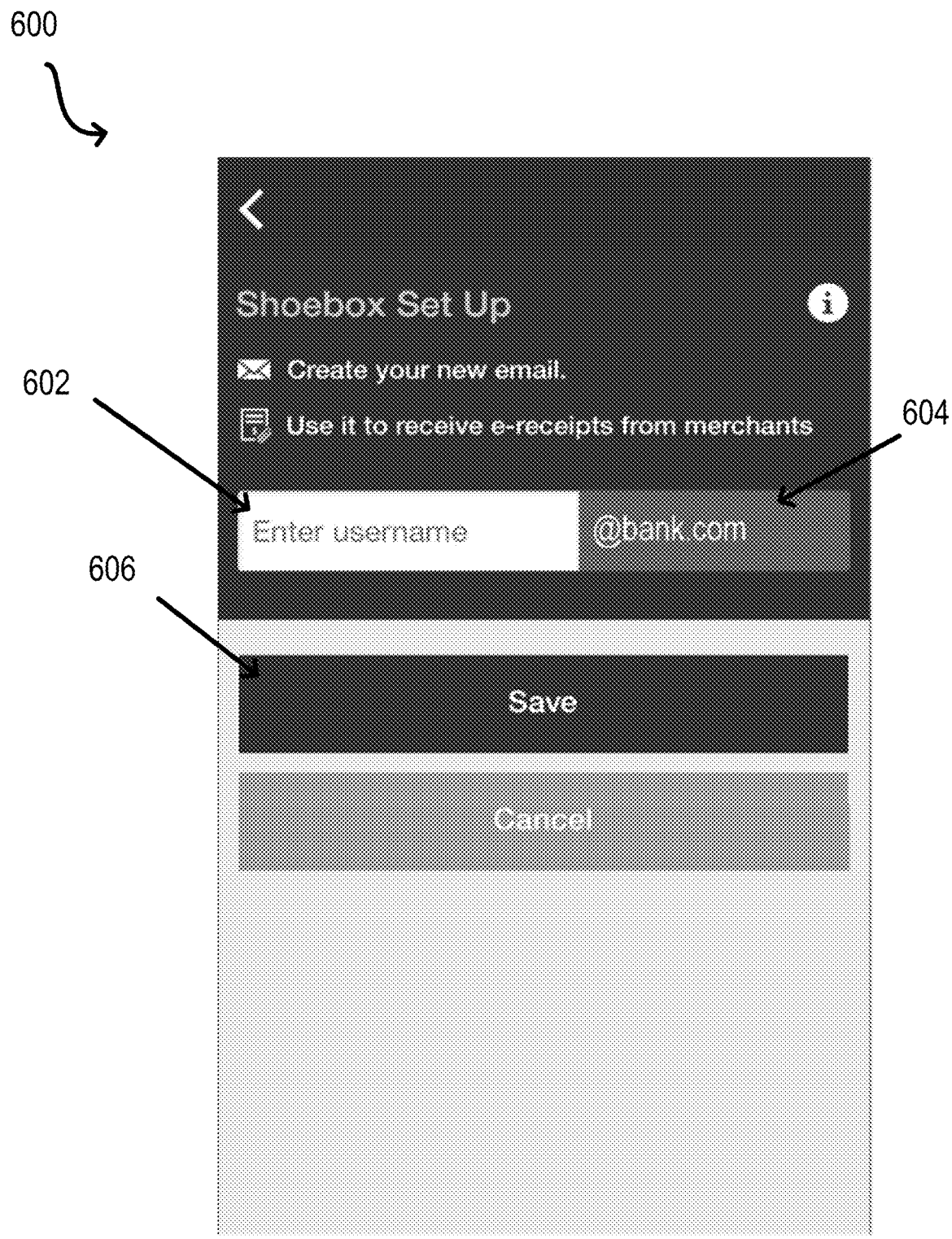
FIG. 6 is an example of a user interface for receiving a username for the unique email address of FIG. 5 according to some aspects of the present disclosure.

FIG. 6 is an example of a user interface 600 for receiving a username for the unique email address of FIG. 5 according to some aspects of the present disclosure. In some aspects, the user interface 600 may be generated by the electronic receipt system 102. In other aspects, the user interface 600 may be generated by the client engine 406 stored in the memory device 402 of the user device 106 of FIG. 4. The user interface 600 may be displayed on the display unit 414 of the user device 106 and includes an input option 602 in which the account holder may enter a username to serve as the local part of the email address. The account holder may enter the username using the keyboard 410 of the user device 106 of FIG. 4. The user interface 600 displays the domain part 604 of the email address to illustrate what the account holder's email address will be if the username is accepted by the electronic receipt system 102. The account holder may select the selection option 606 labeled "Save" to transmit the username entered into the selection from the user device 106 to the electronic receipt system 102 via the network 108.

Returning to FIG. 5, in block 510, the electronic receipt system 102 generates a profile and a unique email address using the username entered into the input option 602 of the user interface 600 of FIG. 6 as the local part of the email address. In some aspects, prior to generating the profile, the electronic receipt system 102 may compare the username entered by the account holder with all of the usernames associated with profiles of other account holders in the authentication information 204 of the secure database 104 to determine whether the username entered by the account holder is unique. One the profile is generated, the unique email address or the username used as the local part of the email address or both, may be stored as authentication information 204 in the secure database 104 and associated with the account holder.

Figure 7:
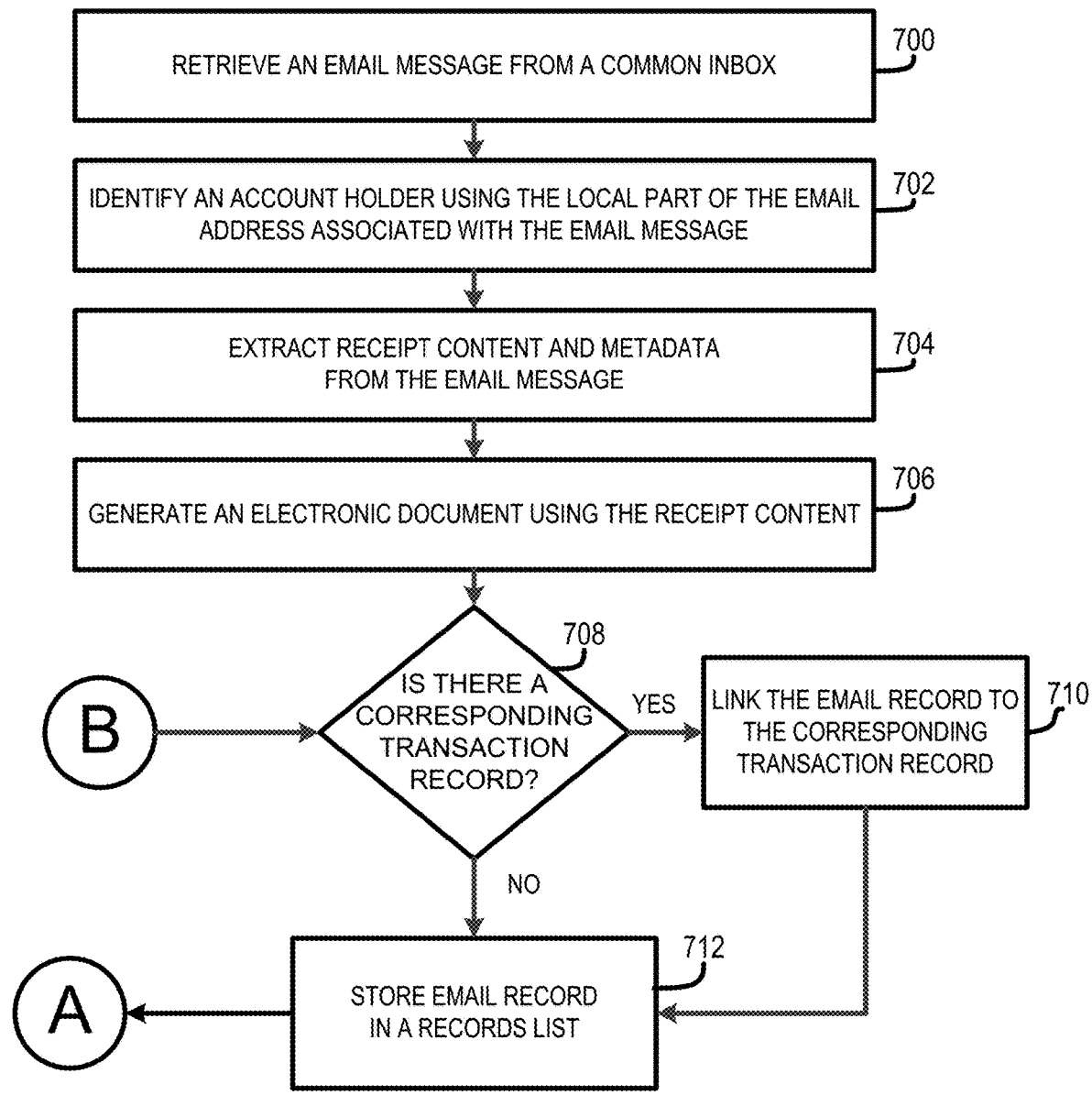
FIG. 7 is flow chart of a process for linking an electronic receipt to a transaction record according to some aspects of the present disclosure.

FIG. 7 is flow chart of a process for linking an electronic receipt to a transaction record according to some aspects of the present disclosure. The process is described with respect to the network environment 100 of FIG. 1 and the electronic receipt system 102 of FIG. 3, though other implementations are possible without departing from the scope of the present disclosure.

In block 700, the electronic receipt system 102 may retrieve an email message from the common inbox 112 of the email system 110. In some aspects, the common inbox 112 may include all email messages transmitted to email addresses having the same domain-name, despite having different local parts. For example, the common inbox 112 may include an email message routed to the email address user1@bank.com and an email message routed to the email address user2@bank.com since both email addresses include the domain part "bank.com." The electronic receipt system 102 may retrieve all email messages in the email address and sort them with the appropriate account holder using the local part of the email address associated with the email message.

In block 702, the electronic receipt system 102 identifies the account holder using the local part of the email address associated with the email message. In some aspects, the electronic receipt system 102 may compare the local part of the address with a list or array of usernames stored in the secure database 104. The matching username may be associated with a profile including the holder identifier 200, account information 202, or authentication information 204 corresponding to the account holder to identify the account holder as the intended recipient of the email message.

In block 704, the electronic receipt system 102 extracts receipt content and metadata from the email message. In some aspects, the server engine 306 may include text-identifying program code or instructions to cause the processing device 300 to identify the metadata and the receipt content. In some aspects, the metadata may include information corresponding to the routing information included in the email message. For example, the metadata may include the "From" information corresponding to the sender of the email message, the "Date" information corresponding to a timestamp of when the email message was sent by the sender or received in the common inbox 112 of the email system 110. In some aspects, the metadata may also include the "Subject" of the email message. In some aspects, the receipt content may include the body of the email message. In some aspects, the body of the email message may include an electronic receipt in text. In other aspects, the body of the email message may include an electronic receipt as an image. In additional and alternative aspects, the receipt content may include an attachment to the email message. The server engine 306 may include program code or instructions to cause the processing device 300 to determine whether an attachment is included in the email address or to determine whether text is included in the body of the email address. The server engine 306 may cause the processing device to extract the metadata and the receipt content from the email message and store them as files or objects in the secure database 104.

Figure 8:
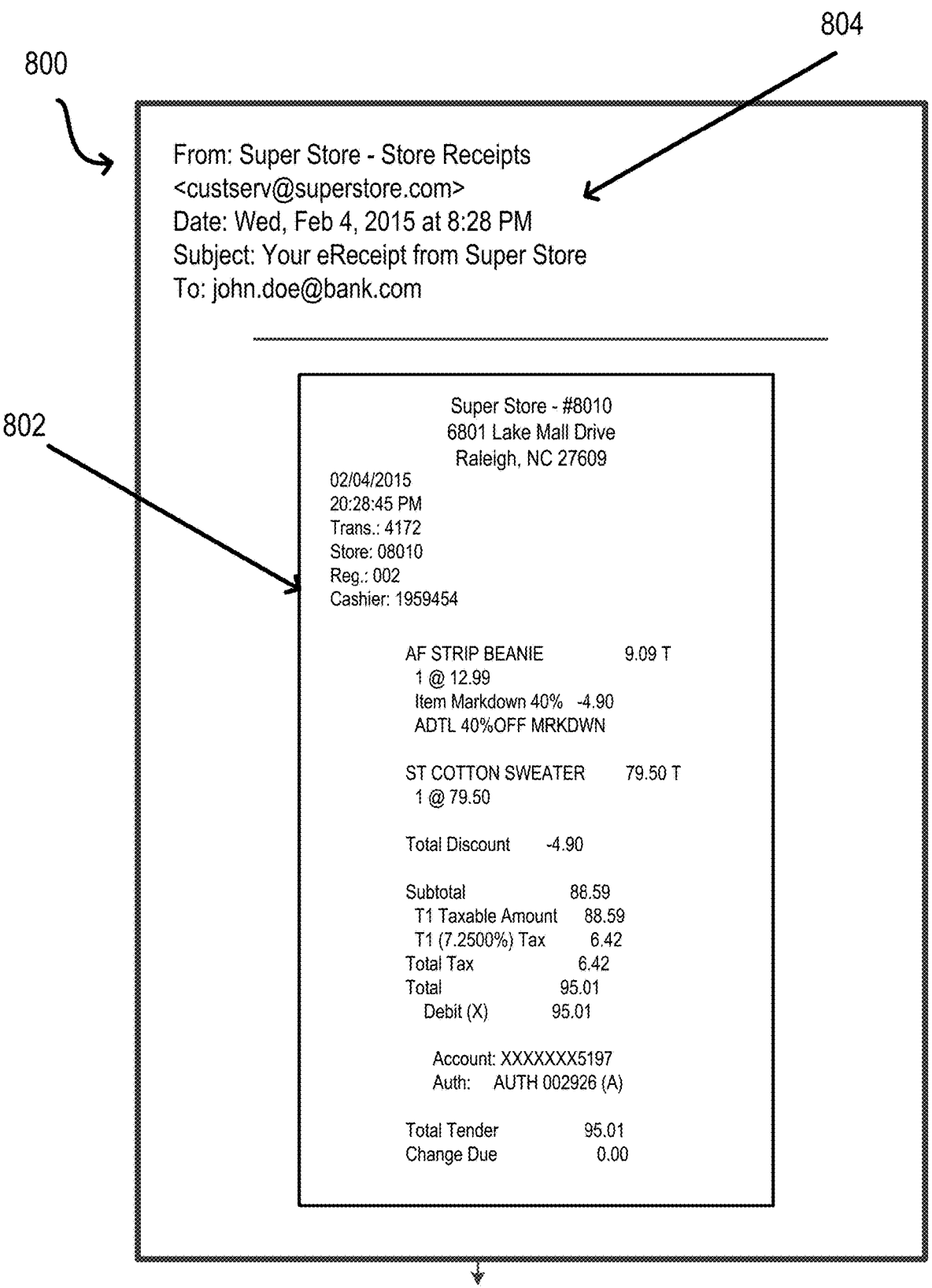
FIG. 8 is an example of an email message including an electronic receipt according to aspects of the present disclosure.

FIG. 8 is an example of an email message 800 including an electronic receipt according to aspects of the present disclosure. The receipt content 802 may include the electronic receipt in the body of the email message 800. In some aspects, the electronic receipt may be an image embedded in the body of the email message 800. In other aspects, the electronic receipt may be text in the body of the email message 800. The electronic receipt includes details corresponding to a transaction between the account holder and a sender. The email message 800 also includes metadata 804. The metadata 804 includes sender information corresponding to the sender of the email message 800 (e.g., "Super Store—Store Receipts <custserv@superstore.com>." The metadata 804 also includes at least the date that the email message 800 was received by the common inbox 112 of the email system 110.

Returning to FIG. 7, the electronic receipt system 102 generates an electronic document using the receipt content 802 extracted from the email message 800 of FIG. 8. In some aspects, the server engine 306 may determine the format of the receipt content 802 (e.g., image, text, etc.) and may convert the receipt content 802 to a standard format that may be accessible from different user devices via the network. In some aspects, the server engine 306 may include known adapter instructions or program code to perform the conversion. In some examples, the format may be compatible with document formats configured to be displayed in a web browser. In some aspects, the format may include a portable document formation (PDF"). In other aspects, the format may include other formats, including but not limited to, a Microsoft® Word® binary file format or XML document format, a log file, an OpenDocument text format, or a rich text format.

In block 708, the electronic receipt system 102 determines if there is a transaction record corresponding to the electronic receipt in the receipt content. In some aspects, the server engine 306 may include a matching algorithm for matching the metadata extracted from the email message to information included in the transaction records stored in the secure database 104 and associated with the account holder. For example, the matching algorithm may include instructions for comparing all or a portion of the alphanumeric characters of the sender of the email message in the metadata with a transaction record having a third party merchant to a transaction having the same characters. The match between the metadata and the transaction record may be confirmed or alternatively performed using metadata information from the "Date" line of the email message compared with a timestamp of a transaction record. For example, the transaction record may include a timestamp corresponding to the date or time that the merchant submitted a request for funds from the account of the account holder subsequent the account holder initiating the transaction using a payment card associated with the account. The matching algorithm may compare the date metadata with the transaction record timestamp to determine whether the corresponding times are within an acceptable range to determine a match.

In additional and alternative aspects, the electronic receipt system 102 may match the electronic receipt to the transaction record using the receipt content. For example, the server engine 306 may include code for deciphering text from the receipt content to determine a transaction amount (e.g., $95.01 for the receipt content 802 of FIG. 8). The matching algorithm may match the electronic receipt to a transaction record having the same amount, or may use the amount to confirm a previous match based on the metadata.

In block 710, subsequent to identifying a corresponding transaction record to the electronic receipt, the electronic receipt system 102 links an email record corresponding to the email message to the transaction record. In some aspects, the email record may include the electronic document generated by the electronic receipt system 102 and including the receipt content. In additional aspects, the email record may also include the extracted metadata and the extracted receipt content separate from the generated electronic document.

In block 712, the electronic receipt system 102 may store the email record in the secure database 104. The electronic receipt system 102 may store the email record in an email records list 210 in the secure database 104. In some aspects, the email records list 210 may include all email records corresponding to email messages routed to the common inbox 112 and addressed to the unique email address of the account holder. In some aspects, blocks 710 and 712 may be performed simultaneously where the electronic receipt data stores a transaction ID in the secure database 104 with the email record as a pointer to link the email record to the stored transaction record associated with the transaction ID. The email records list 210 may include email records linked to secure records in the transaction information 208 as described in block 710 and may include email records determined by the electronic receipt system 102 not to correspond to a secure record.

Figure 9:
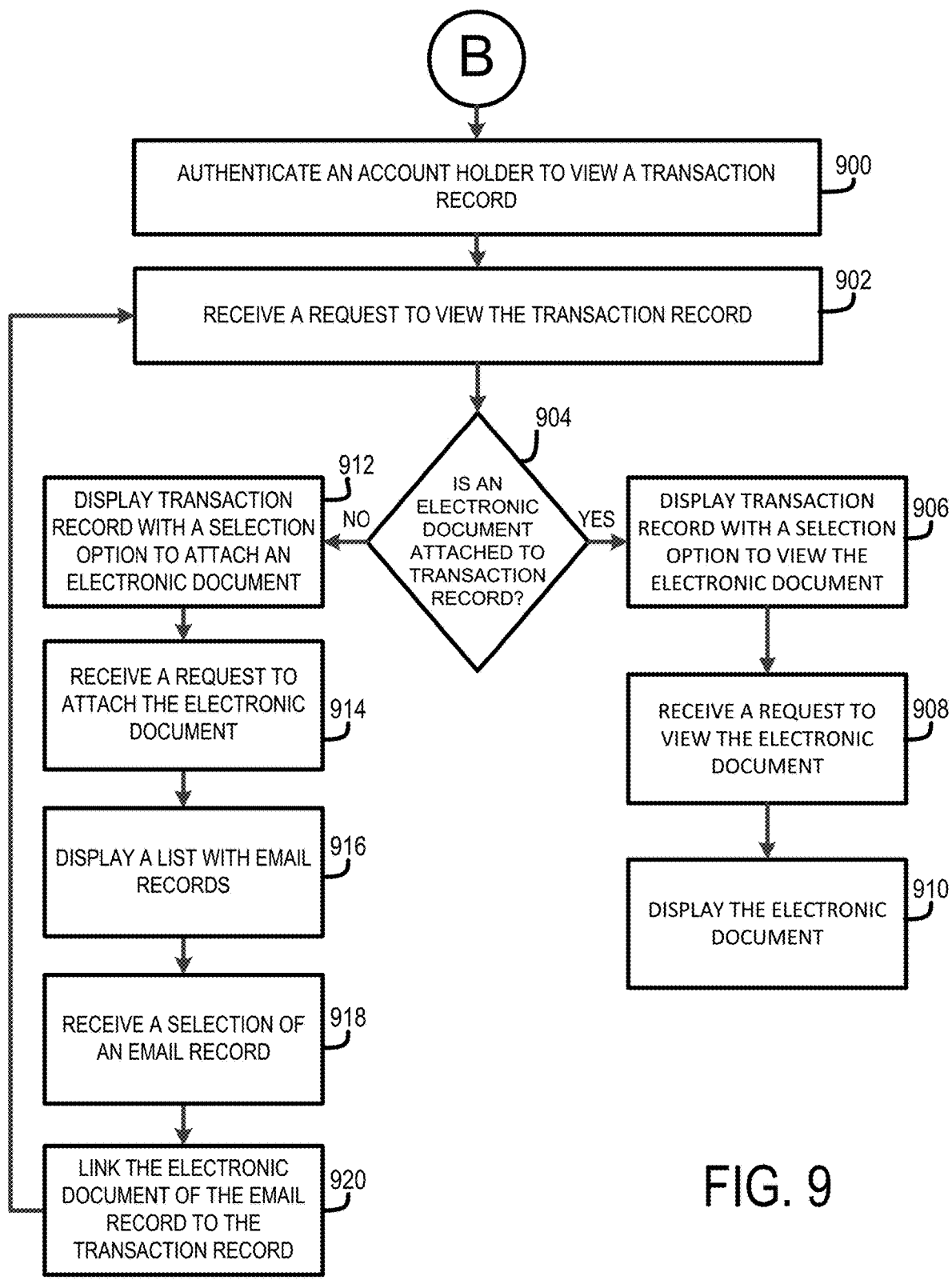
FIG. 9 is a flowchart of a process for displaying an electronic document linked to a transaction record according to an aspect of the present disclosure.

FIG. 9 is a flowchart of a process for displaying an electronic document linked to a transaction record according to an aspect of the present disclosure.

In block 900, the electronic receipt system 102 authenticates an account holder to view a transaction record stored in the secure database 104. In some aspects, the secure database 104 or another database accessible to the electronic receipt system 102 may include authentication information 204 corresponding to the account holder, such as a user identifier, a password, a social security number, and account number, a PIN, or other identifier. The account holder may be required to transmit the authentication information from the user device 106 to the electronic receipt system 102 via the network 108 (e.g., through a user interface displayed on the display unit 414 of the user device 106 of FIG. 4). The electronic receipt system 102 may receive the authentication information from the user device 106 and compare it to authentication information 204 stored in the secure database 104 to verify that the account holder is authorized to view secure information related to the account associated with the authentication information 204.

In block 902, the electronic receipt system 102 receives a request to view the transaction record. In some aspects, the request may be received from the user device 106 via the network 108 as a signal corresponding to the request. In some aspects, the request may be generated by the user device 106 in response to a selection of a selection option on a user interface generated by the electronic receipt system 102 or the user device 106 via the client engine 406 of FIG. 4. For example, a user interface may include multiple transaction records corresponding to transactions depositing or withdrawing funds from the account of the account holder. The transaction records may include a selection option to generate the signal corresponding to the request to view the transaction record.

In block 904, the electronic receipt system 102 determines if the transaction record has an electronic document 212 linked to the transaction record including receipt content corresponding to an electronic receipt of the transaction. In some aspects, this determination is made in response to the request to view the secure record of the transaction information 208. In other aspects, this determination may be made prior to the account holder selecting to view the transaction record. Using the example where the request is received via a selection option on a user interface including a list of transaction records, the electronic receipt system 102 may determine whether an electronic document is attached to each of the transaction records included in the list subsequent to authenticating the account holder to view the transaction records.

The electronic receipt system 102 may determine whether an electronic document is linked to the transaction record by determining whether there is a pointer or other link included in the secure database 104 in one or both of the locations where the transaction record and the electronic document are stored. For example, the server engine 306 may cause the processing device 300 to identify a transaction ID pointer corresponding to the transaction record that is associated with the electronic document in the secure database 104.

In block 906, subsequent to the electronic receipt system 102 determining that an electronic document is linked to the transaction record selected by the account holder, the electronic receipt system 102 displays information from the transaction record on a user interface. The user interface includes a selection option to view the electronic receipt linked to the transaction record.

Figure 10:
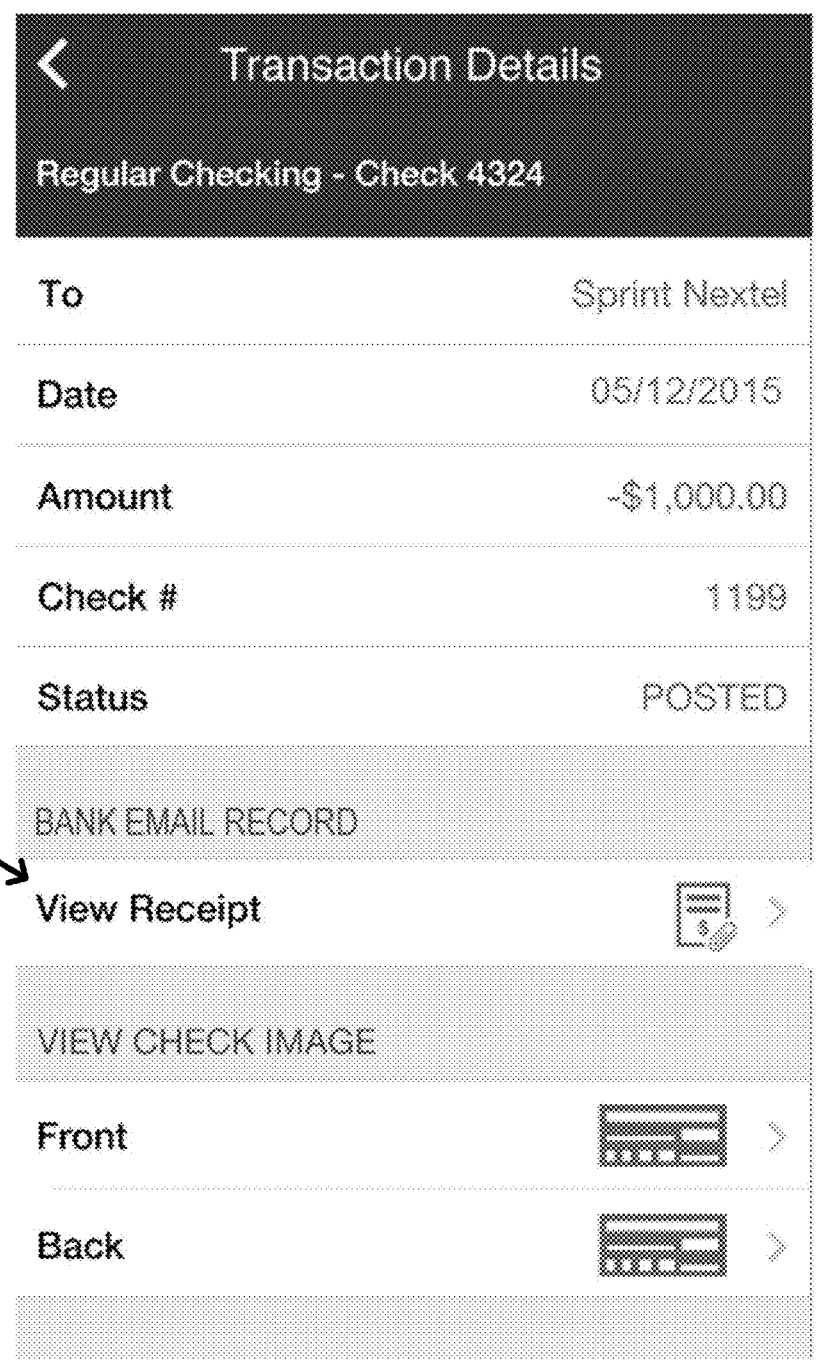
FIG. 10 is an example of a user interface including a selection option for viewing the electronic document of FIG. 9 according to aspects of the present disclosure.

FIG. 10 is an example of a user interface 1000 including a selection option 1002 for viewing the electronic document of FIG. 9 according to aspects of the present disclosure. The user interface 1000 may be displayed to the account holder on the display unit 414 of the user device 106 of FIG. 4. In some aspects, the user interface 1000 may be generated by the server engine 306 of the electronic receipt system 102. In other aspects, the user interface 1000 may be generated by the client engine 406 of the user device 106 of FIG. 4. The user interface 1000 may include details corresponding to the transaction between the account holder and a third party. The details may include the name of the third party, the date of the transaction, the amount withdrawn or deposited into the account for the transaction, the method of payment for the transaction, and the status of the transaction (e.g., posted, pending, etc.). The selection option 1002 may be selected by the account holder using the selection tool 412 of the user device of FIG. 4. For example, the selection tool 412 may include a touchscreen and the account holder may select the selection option 1002 by pressing the display unit 414 of the user device 106 of FIG. 4 in the area of the selection option 1002. The selection of the selection option 1002 may generate a signal corresponding to a request by the account holder to view the electronic document of the email record linked to the transaction.

Returning to FIG. 9, in block 908, the electronic receipt system 102 receives a request to view the electronic document. For example, the electronic receipt system 102 may receive the signal generated in response to the account holder selecting the selection option 1002 of FIG. 10 corresponding to the request to view the electronic document. In block 910, the electronic receipt system 102 generates a user interface including the electronic document.

Figure 11:
FIG. 11 is an example of a user interface displaying the electronic document of FIG. 9 according to aspects of the present disclosure.

FIG. 11 is an example of a user interface 1100 displaying the electronic document 1102 of FIG. 11 according to aspects of the present disclosure. The electronic document 1102 may include the receipt content extracted from the email message retrieved from the common inbox 112 by the electronic receipt system 102. The user interface 1100 also includes a selection option 1104. In FIG. 11, the selection option 1104 is an icon that may be selected by the account holder using the selection tool 412 of the user device 106 of FIG. 4. A selection of the selection option 1104 may generate a signal corresponding to a request by the account holder to view or edit the metadata and description in the email record.

Returning to FIG. 9, in block 912, subsequent to the electronic receipt system 102 determining that there is no electronic document including receipt content linked to the transaction record selected by the account holder, the electronic receipt system 102 displays the transaction record on a user interface. The user interface includes a selection option that may be selected by the account holder to link, or attach, to the transaction record an electronic document previously transmitted to the email system 110 or the electronic receipt system 102.

Figure 12:
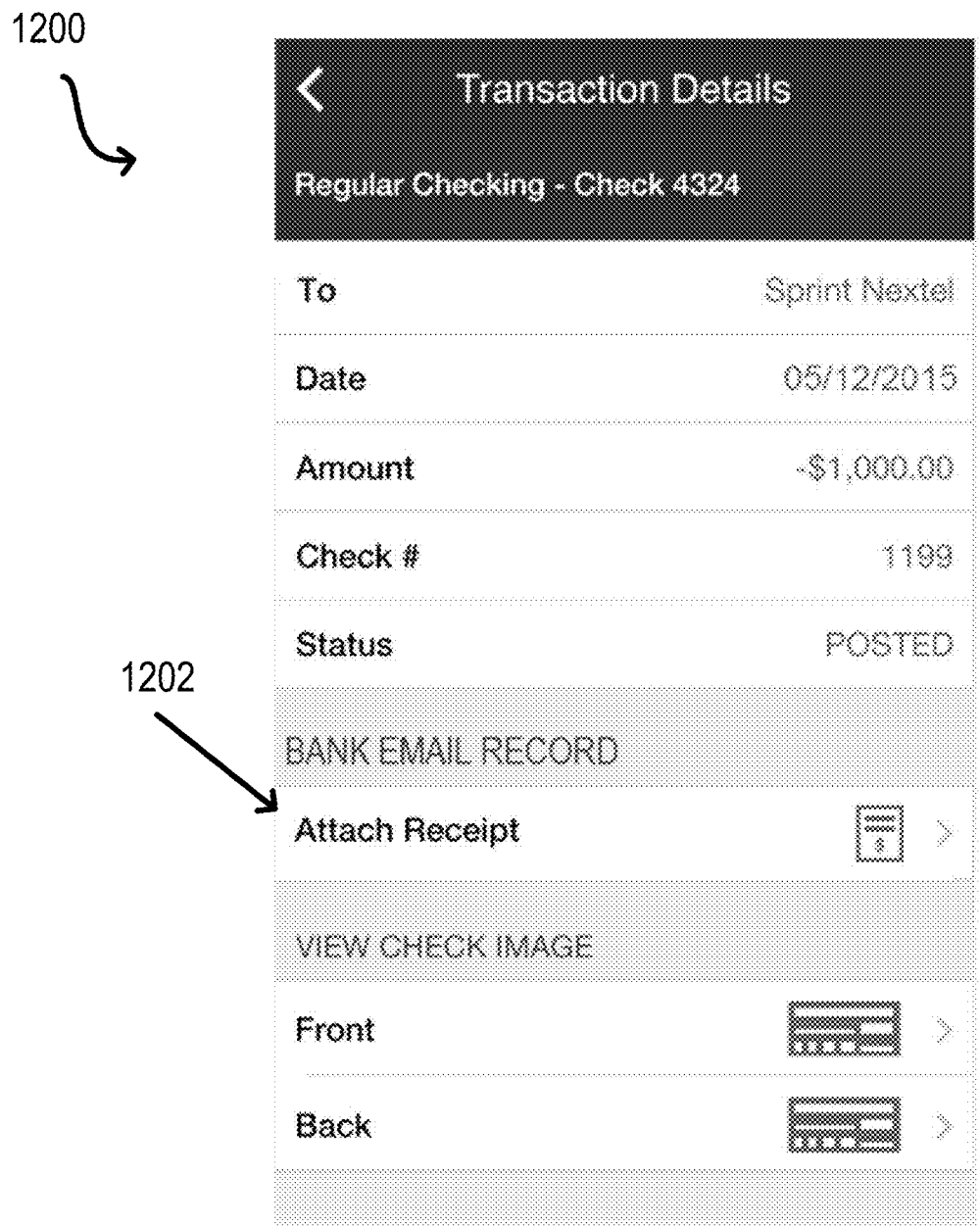
FIG. 12 is an example of a user interface including a selection option for linking an electronic document to a transaction record according to aspects of the present disclosure.

FIG. 12 is an example of a user interface 1200 including a selection option 1202 for linking an electronic document to a transaction record according to aspects of the present disclosure. The user interface 1200 may be displayed to the account holder on the display unit 414 of the user device 106 of FIG. 4. In some aspects, the user interface 1200 may be generated by the server engine 306 of the electronic receipt system 102. In other aspects, the user interface 1200 may be generated by the client engine 406 of the user device 106 of FIG. 4. In some aspects, the user interface 1200 may be identical or similar to the user interface 1000 of FIG. 10 with the exception of the selection option 1202 in place of the selection option 1002 of FIG. 10. For example, the user interface 1200 includes details corresponding to the transaction between the third party and the account holder. The selection option 1202 may be selected by the account holder using the selection tool 412 of the user device 106 of FIG. 4. In some aspects, the selection of the selection option 1202 may generate a signal corresponding to a request by the account holder to identify an email record in the email records list that corresponds to the transaction record.

Returning to FIG. 9, in block 914 the electronic receipt system 102 receives a request to attach an electronic document associated with a selected email record to the transaction record. For example, electronic receipt system 102 may receive the signal generated in response to the account holder's selection of the selection option 1202 of FIG. 12 corresponding to the request to attach the electronic document associated with the email record shown on the selection option 1202. In block 916, the electronic receipt system 102 displays a list of email records retrieved by the electronic receipt system 102 from the common inbox 112 of the email system 110 or from the user device 106 via the network 108. In some aspects, the list may be displayed on a user interface generated by the electronic receipt system 102 or the user device 106.

Figure 13:
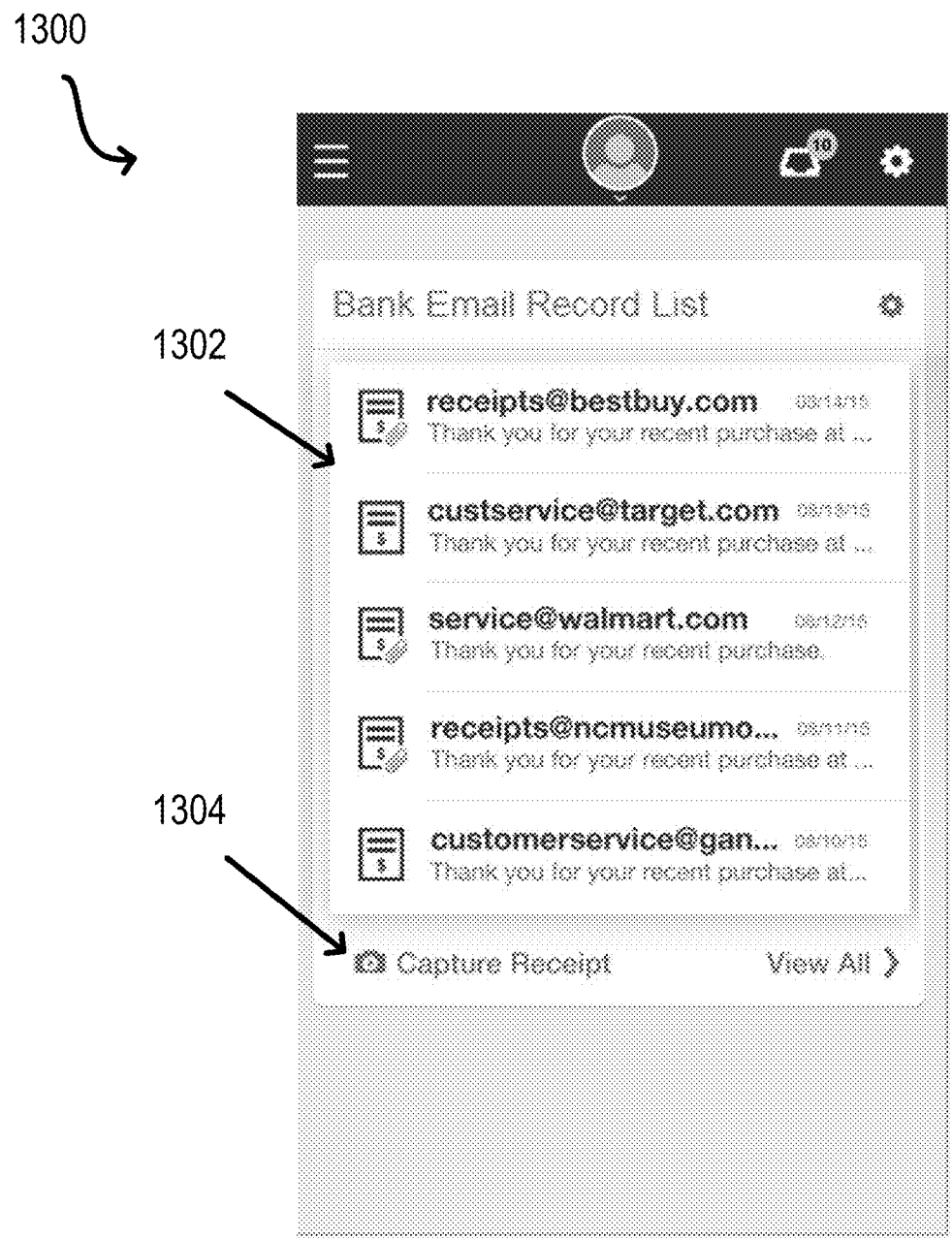
FIG. 13 is an example of a user interface for displaying a list of email records including an electronic document selectable to attach to a transaction record according to aspects of the present disclosure.

FIG. 13 is an example of a user interface 1300 for displaying a list 1302 including email records that may be selected by the account holder to attach a corresponding electronic document to a transaction record according to aspects of the present disclosure. In some aspects, each email record in the list 1302 may include a selection option that may be selected by the account holder via the selection tool 412 of the user device 106. In some aspects, the selection option corresponding to the email records in the list 1302 may generate a signal corresponding to a request to attach the selected email record to the transaction record described in FIG. 12. In other aspects, the selection option may generate a signal corresponding to a request to review the email record or the electronic document associated with the email record selected from the list 1302. The user interface generated in response to the signal may include an additional selection option to generate the signal corresponding to the request to attach the email record to the transaction record.

The user interface 1300 also includes a selection option 1304 that may allow an account holder to capture a new receipt from the user device 106 that may be used to generate an electronic document for attaching to a transaction record. For example, in response to a selection of the selection option 1304, the electronic receipt system 102 or the user device 106 may generate a user interface including a live feed of the recording device 416 of the user device 106 of FIG. 4. The recording device 416 may allow the account holder to capture an image of a paper receipt that may be transmitted to the electronic receipt system 102. The image of the receipt may be used as receipt content for generating an electronic document that may be linked to the transaction record.

Returning to FIG. 9, in block 918, the electronic receipt system 102 receives the selection of the email record associated with one of the email records in the list 1302 of email records of FIG. 13. In some aspects, the selection may correspond to a signal transmitted from the user device 106 and received by the electronic receipt system 102 via the network 108 corresponding to a request to attach the electronic document corresponding to the email record from the list 1302 to the transaction record. In one example, the signal may be generated by the selection of the selection option corresponding to the email record in the list 1302 of FIG. 13. In another example, the selection of the selection option corresponding to an email record from the list 1302 may generate a signal corresponding to a request to view the electronic document or email record to determine if it corresponds to the correct transaction associated with the transaction record. The user interface displaying the electronic document or email record may include an additional selection option to generate the signal corresponding to a request to attach the electronic document to the transaction.

In block 920, the electronic receipt system 102 links the electronic document of the selected email record to the transaction record. For example, the electronic document may be linked to the transaction record as described in block 710 of FIG. 7. Subsequent to linking the electronic document to the email record, when the transaction record is selected by the account holder for viewing the details of the transaction record as described in block 902, the electronic receipt system 102 may determine that the electronic document is attached to the transaction record and generate a user interface, such as user interface 1000 of FIG. 10, displaying the details of the transaction record with a selection option to view the electronic receipt as described in blocks 904 and 906.

Figure 14:
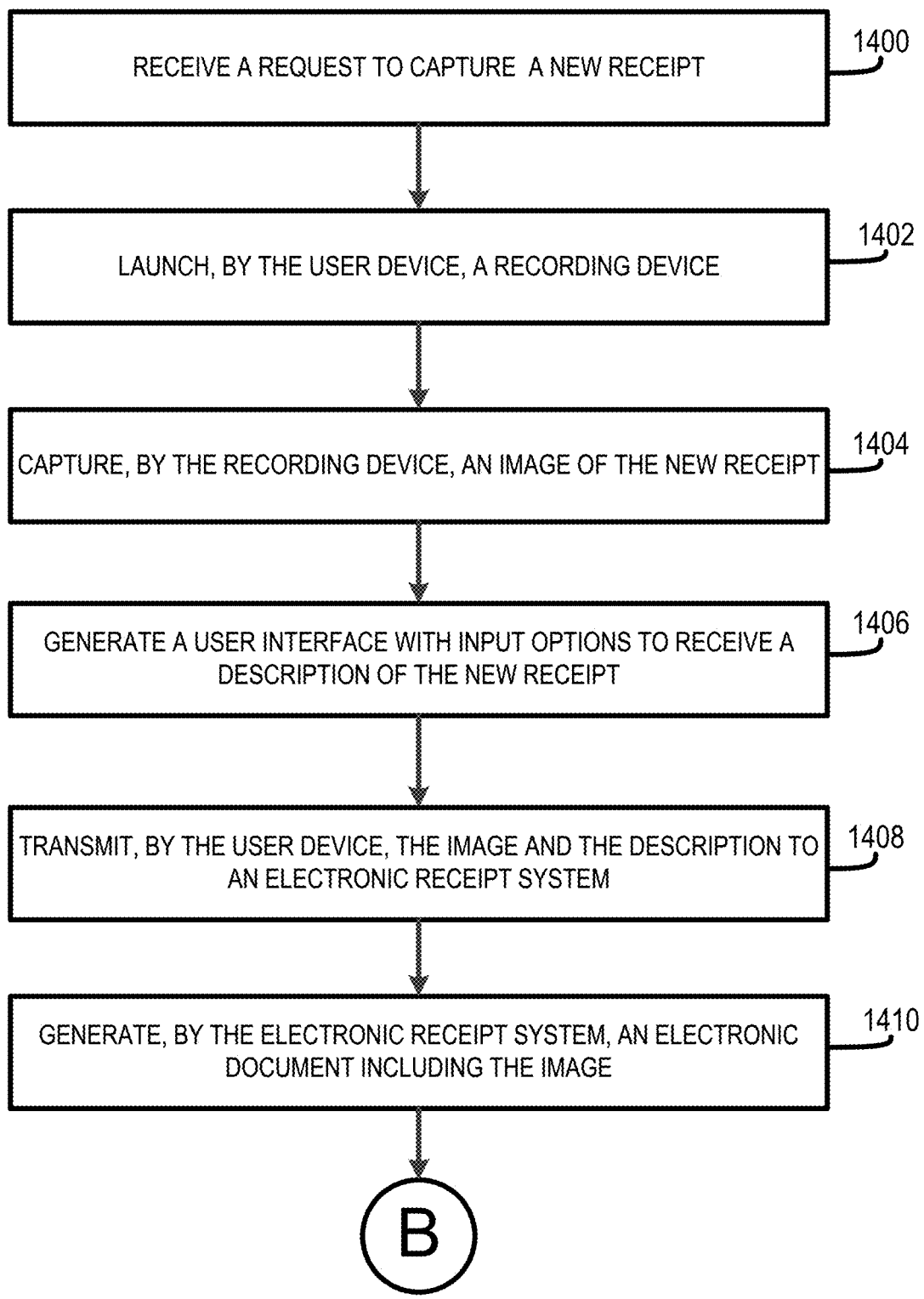
FIG. 14 is a flow chart of a process for generating an electronic document of a receipt captured by a recording device according to aspects of the present disclosure.

FIG. 14 is a flow chart of a process for generating an electronic document of a receipt captured by a user device according to aspects of the present disclosure. The process is described with respect to the network environment 100 of FIG. 1, the electronic receipt system 102 of FIG. 3, and the user device 106 of FIG. 4, though other implementations are possible without departing from the scope of the present disclosure.

In block 1400, the user device 106 may receive a request to capture a new receipt. In some aspects, the user device 106 may receive the request in response to a selection by the account holder from a user interface including a selection option corresponding to the request. For example, the user interface 1300 of FIG. 13 may be displayed on the user device 106 and the selection option 1304 may correspond to the request to capture a new receipt that the account holder would like to attach to a transaction record in the secure database 104. The account holder may select the selection option 1304 using the selection tool 412 of the user device 106. In response, a signal may be generated corresponding to the request. In some aspects, the signal may be transmitted to the electronic receipt system 102 and the electronic receipt system 102 may transmit a second signal to the user device 106 in response to instruct the user device 106 to take an action for allowing the account holder to capture the new receipt. In other aspects, the signal generated in response to the selection of the selection option 1304 may be received directly by the user device 106 via the client engine 406.

In block 1402, the user device 106 launches the recording device 416 of the user device 106 to capture the new receipt. In some aspects, the client engine 406 may include instructions to cause the processing device to actuate the recording device 416 in response to receiving the signal corresponding to the request to capture a new receipt. The recording device 416 may include a camera or other capturing device configured to generate an image of the new receipt. Upon the launch of the recording device 416, the user device 106 or the electronic receipt system 102 may generate a user interface including a live feed of the recording device 416. In some aspects, the client engine 406 of the user device 106 may cause the processing device 400 of the user device 106 to retrieve templates of the user interface to generate the user interface. In other aspects, the server engine 306 of the electronic receipt system 102 may cause the processing device of the electronic receipt system 102 to generate the user interface and transmit the user interface to the user device 106 via the network 108.

Figure 15:
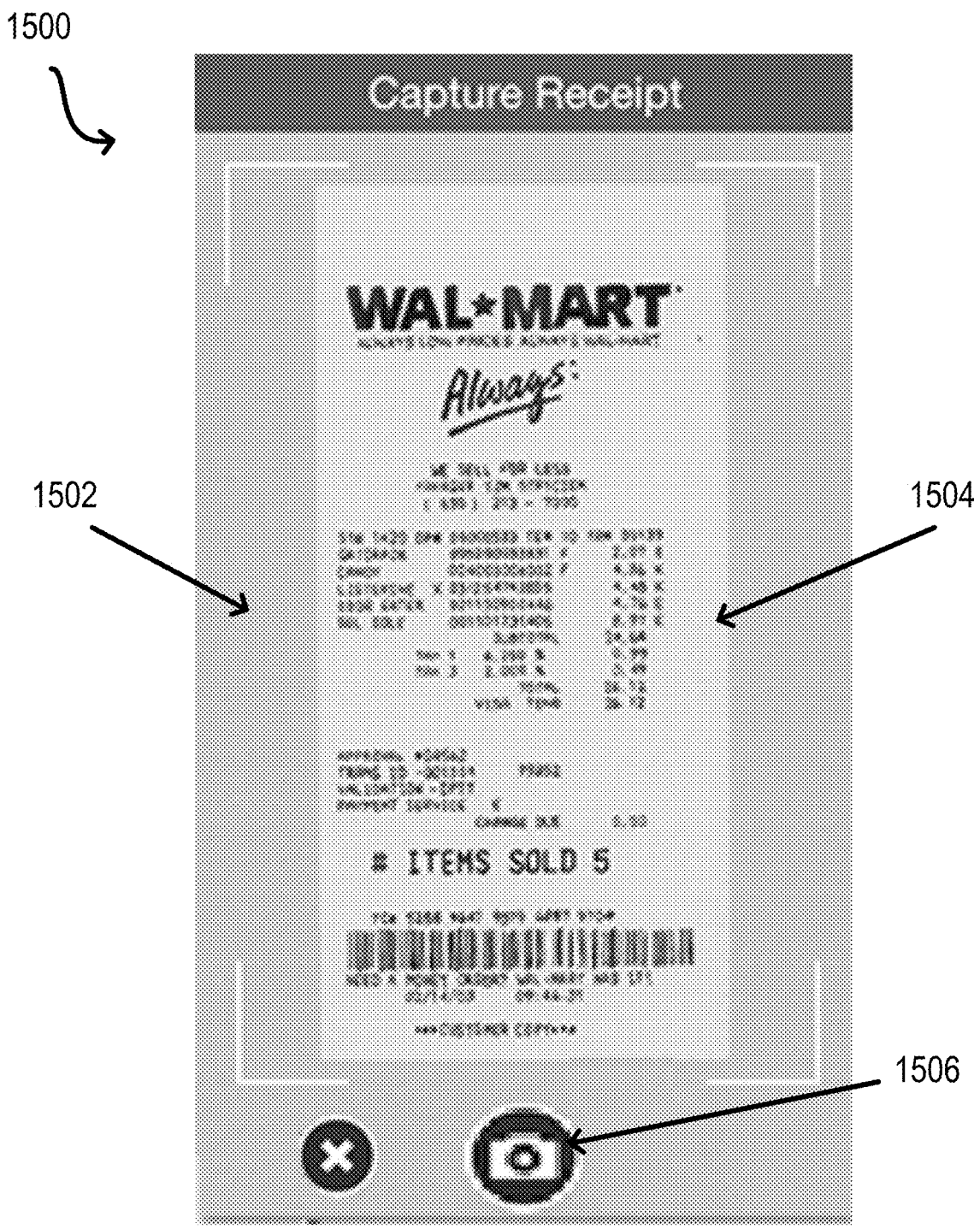
FIG. 15 is an example of a user interface including a live feed of a recording device for capturing a receipt according to aspects of the present disclosure.

FIG. 15 is an example of a user interface 1500 including a live feed 1502 of the recording device 416 of the user device 106 for capturing a receipt according to aspects of the present disclosure. The live feed 1502 may include a real-time graphical representation of an object positioned in front of a lens of the recording device 416. For example, the live feed 1502 of FIG. 15 includes a graphical representation of a paper receipt 1504. The user interface 1500 also includes a capture button 1506. The capture button 1506 may include a selection option that may be selected by the account holder to cause the recording device 416 to capture an image of the paper receipt 1504 in the live feed 1502.

Returning to FIG. 14, in block 1404, the recording device 416 captures an image of the new receipt. In some aspects, the recording device 416 may capture the image in response to the account holder selecting the capture button 1506 of FIG. 15. In other aspects, the recording device 416 may include separate buttons on the recording device 416 itself to cause the recording device 416 to capture the image.

In block 1406, the user device 106 or the electronic receipt system 102 generates a user interface including input options to receive a description for the new receipt. The description for the new receipt information may include details corresponding to the transaction, such as, but not limited to, the third party of the transaction, the amount of the transaction, an explanation or personal description for the transaction, and a time of the transaction.

Figure 16:
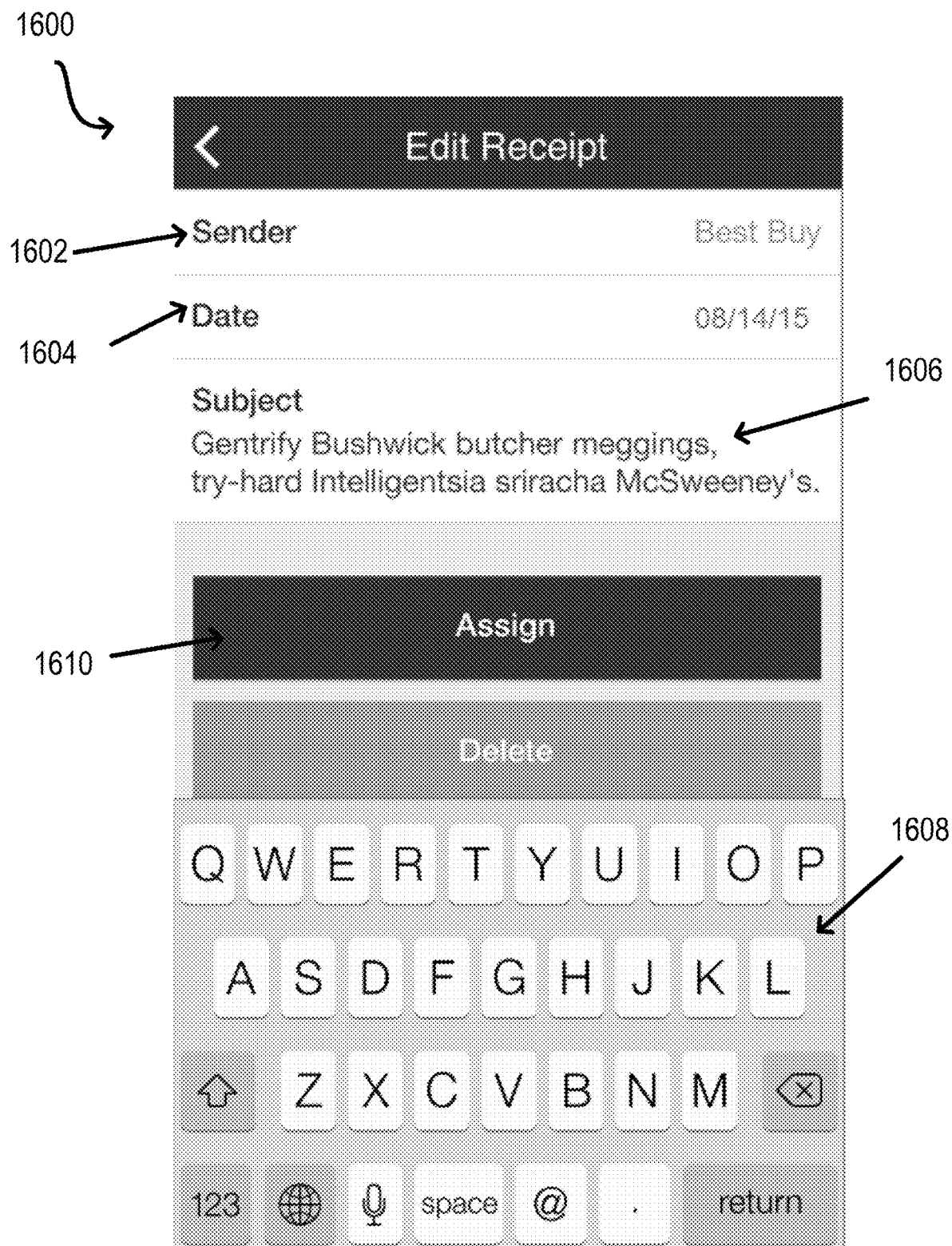
FIG. 16 is an example of a user interface including input options for describing the receipt captured by the user device of FIG. 14 according to aspects of the present disclosure.

FIG. 16 is an example of a user interface 1600 including input options for describing the receipt captured by the user device of FIG. 14 according to aspects of the present disclosure. The input options included in the user interface 1600 include a sender input option 1602 corresponding to the third party of the transaction, a date input option 1604 corresponding to the date or time of the transaction, and a subject input option 1606 corresponding to a personal description of the transaction. In some aspects, the account holder may select the input option 1602, 1604, 1606 using the selection tool 412 and then use the keyboard 410 of the user device to enter alphanumeric text corresponding to the appropriate description. In FIG. 16, the keyboard 410 of the user device 106 includes a touchscreen keyboard 1608 that may be overlaid onto the user interface 1600. In some aspects, the touchscreen keyboard 1608 may be displayed in response to a selection of one of the input options 1602, 1604, 1606 to allow the account holder to enter text corresponding to the description of the receipt. The account holder may use the selection tool 412 of the user device 106 (e.g., a touchscreen) to select the alphanumeric categories for entering the text of the description. The account holder may submit the image captured by the recording device 416 and the description entered into the input options 1602, 1604, 1606, and by selecting, via the selection tool 412, the assign button 1610.

In some aspects, the user interface 1600 may also represent a user interface generated in response to a selection of the selection option 1104 in FIG. 11 corresponding to a request to edit a description of the electronic receipt displayed in the electronic document 1102. For example, the description may correspond to the metadata extracted from the email message and corresponding to the electronic receipt.

Returning to FIG. 14, in block 1408, the user device 106 may transmit the image and description of the receipt captured by the recording device 416 to the electronic receipt system 102 via the network 108. In some aspect, the image and description may be transmitted in response to the selection of the assign button 1610 in the user interface 1600 of FIG. 16.

In block 1410, the electronic receipt system 102 generates an electronic document including the image captured by the recording device 416 of the user device 106. In some aspects, the electronic receipt system 102 may treat the image as receipt content from an email message and generate the document in the same manner described in block 706 of FIG. 7. In some aspects, the electronic document may be linked to a transaction record in the secure database 104. For example, where the image of the new receipt was generated in response to a selection of the capture button selection option 1304 of FIG. 13 to capture the image for a selected transaction record, the electronic receipt system 102 may link the electronic document generated using the image to the selected transactions. In other aspects, the electronic receipt system 102 may determine that there is not a transaction record corresponding to the electronic document and store the electronic document in a list or array in the secure database 104 as described in block 712 of FIG. 7.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

The invention claimed is:

1. A user device comprising:
a processing device; and
a memory device including instructions executable by the processing device to cause the processing device to:
receive a first user interface from an electronic receipt system, the first user interface being displayable on a display of the user device and including:
transaction details about a transaction between a user of the user device and a third party; and
a first selection option that is selectable by the user via the user device for viewing an electronic document comprising a receipt for the transaction;
based on a first selection of the first selection option, receive a second user interface from the electronic receipt system, the second user interface being displayable on the display of the user device and including:
the electronic document; and
a second selection option that is selectable by the user via the user device for modifying metadata associated with the receipt, the metadata including (1) sender information corresponding to a sender of the receipt to an electronic mail (email) server via an email message and (2) timestamp information corresponding to a date and time that the email message was received by the email server or stored in a common inbox of the email server, and the metadata being different from receipt content within the email message;
based on a second selection of the second selection option, enable the user to modify the metadata associated with the receipt;
receive modified metadata for the receipt as user input; and
transmit the modified metadata to the electronic receipt system, wherein the electronic receipt system is configured to store the modified metadata in relation to the receipt, and wherein the electronic receipt system is configured to identify a secure record of the transaction stored in a database based on the timestamp information in the metadata.

2. The user device of claim 1, wherein the memory device further includes instructions that are executable by the processing device to cause the processing device to receive a third user interface from the electronic receipt system, the third user interface including:
a first input option for allowing the user to modify the sender information; and
a second input option for allowing the user to input a description of the transaction.

3. The user device of claim 1, wherein the memory device further includes instructions that are executable by the processing device to cause the processing device to receive a third user interface from the electronic receipt system, the third user interface including an input option for allowing the user to modify the timestamp information associated with the transaction.

4. The user device of claim 1, wherein the user device includes a recording device, and wherein the memory device further includes instructions that are executable by the processing device to cause the processing device to:
operate the recording device to capture an image of a new receipt for a second transaction between the user and a new third party;
receive an input from the user, the input including a receipt detail corresponding to the new receipt, the receipt detail including at least one of (1) a name of the new third party, (2) a transaction date of the second transaction, or (3) a description of the second transaction; and
transmit the image and the receipt detail to the electronic receipt system for storage.

5. The user device of claim 4, wherein the memory device further includes instructions that are executable by the processing device to cause the processing device to receive, from the electronic receipt system:
a third user interface including details corresponding to the second transaction and a third selection option, the third selection option being selectable by the user via the user device for associating the image and the receipt detail with the secure record.

6. The user device of claim 1, wherein the user device is a mobile device.

7. The user device of claim 1, wherein the memory device further includes instructions that are executable by the processing device to cause the processing device to receive authentication information from the user of the user device for authenticating the user with the electronic receipt system to access the secure record of the transaction between the user and the third party.

8. A method comprising:
receiving, by a user device, a first user interface from an electronic receipt system, the first user interface being displayable on a display of the user device and including:
transaction details about a transaction between a user of the user device and a third party; and
a first selection option that is selectable by the user via the user device for viewing an electronic document comprising a receipt for the transaction;
receiving, by the user device and based on a first selection of the first selection option, a second user interface from the electronic receipt system, the second user interface being displayable on the display of the user device and including:
the electronic document; and
a second selection option that is selectable by the user via the user device for modifying metadata associated with the receipt, the metadata including (1) sender information corresponding to a sender of the receipt to an electronic mail (email) server via an email message and (2) timestamp information corresponding to a date and time that the email message was received by the email server or stored in a common inbox of the email server, and the metadata being different from receipt content within the email message;
based on a second selection of the second selection option, enabling, by the user device, the user to modify the metadata associated with the receipt;
receiving, by the user device, modified metadata for the receipt as user input; and
transmitting, by the user device, the modified metadata to the electronic receipt system, wherein the electronic receipt system is configured to store the modified metadata in relation to the receipt, and wherein the electronic receipt system is configured to identify a secure record of the transaction stored in a database based on the timestamp information in the metadata.

9. The method of claim 8, further comprising receiving a third user interface from the electronic receipt system, the third user interface including:
a first input option for allowing the user to modify the sender information; and
a second input option for allowing the user to input a description of the transaction.

10. The method of claim 8, further comprising receiving a third user interface from the electronic receipt system, the third user interface including an input option for allowing the user to modify the timestamp information associated with the transaction.

11. The method of claim 8, wherein the user device includes a recording device, and further comprising:
operating the recording device to capture an image of a new receipt for a second transaction between the user and a new third party;
receiving an input from the user, the input including a receipt detail corresponding to the new receipt, the receipt detail including at least one of (1) a name of the new third party, (2) a transaction date of the second transaction, or (3) a description of the second transaction; and
transmitting the image and the receipt detail to the electronic receipt system for storage.

12. The method of claim 11, further comprising receiving, from the electronic receipt system:
a third user interface including details corresponding to the second transaction and a third selection option, the third selection option being selectable by the user via the user device for associating the image and the receipt detail with the secure record.

13. The method of claim 8, wherein the user device is a mobile device.

14. The method of claim 8, further comprising receiving authentication information from the user of the user device for authenticating the user with the electronic receipt system to access the secure record of the transaction between the user and the third party.

15. A non-transitory computer-readable medium comprising program code that is executable by a processing device of a user device for causing the processing device to:
receive a first user interface from an electronic receipt system, the first user interface being displayable on a display of the user device and including:
transaction details about a transaction between a user of the user device and a third party; and
a first selection option that is selectable by the user via the user device for viewing an electronic document comprising a receipt for the transaction;
based on a first selection of the first selection option, receive a second user interface from the electronic receipt system, the first user interface being displayable on the display of the user device and including:
the electronic document; and a second selection option that is selectable by the user via the user device for modifying metadata associated with the receipt, the metadata including (1) sender information corresponding to a sender of the receipt to an electronic mail (email) server via an email message and (2) timestamp information corresponding to a date and time that the email message was received by the email server or stored in a common inbox of the email server, and the metadata being different from receipt content within the email message;

based on a second selection of the second selection option, enable the user to modify the metadata associated with the receipt;

receive modified metadata for the receipt as user input; and transmit the modified metadata to the electronic receipt system, wherein the electronic receipt system is configured to store the modified metadata in relation to the receipt, and wherein the electronic receipt system is configured to identify a secure record of the transaction stored in a database based on the timestamp information in the metadata.

16. The non-transitory computer-readable medium of claim 15, further comprising program code that is executable by the processing device to cause the processing device to receive a third user interface from the electronic receipt system, the third user interface including:

a first input option for allowing the user to modify the sender information; and a second input option for allowing the user to input a description of the transaction.

17. The non-transitory computer-readable medium of claim 15, further comprising program code that is executable by the processing device to cause the processing device to receive a third user interface from the electronic receipt system, the third user interface including an input option for allowing the user to modify the timestamp information associated with the transaction.

18. The non-transitory computer-readable medium of claim 15, wherein the user device includes a recording device, and further comprising program code that is executable by the processing device to cause the processing device to:

operate the recording device to capture an image of a new receipt for a second transaction between the user and a new third party;

receive an input from the user, the input including a receipt detail corresponding to the new receipt, the receipt detail including at least one of (1) a name of the new third party, (2) a transaction date of the second transaction, or (3) a description of the second transaction; and transmit the image and the receipt detail to the electronic receipt system for storage.

19. The non-transitory computer-readable medium of claim 18, further comprising program code that is executable by the processing device to cause the processing device to receive, from the electronic receipt system:

a third user interface including details corresponding to the second transaction and a third selection option, the third selection option being selectable by the user via the user device for associating the image and the receipt detail with the secure record.

20. The non-transitory computer-readable medium of claim 15, further comprising program code that is executable by the processing device to cause the processing device to receive authentication information from the user of the user device for authenticating the user with the electronic receipt system to access the secure record of the transaction between the user and the third party.

* * * * *